Jan. 25, 1966  G. C. ELLERBECK  3,231,192
BACK TRANSFER MECHANISM FOR CALCULATING MACHINE
Filed May 31, 1963  12 Sheets-Sheet 1
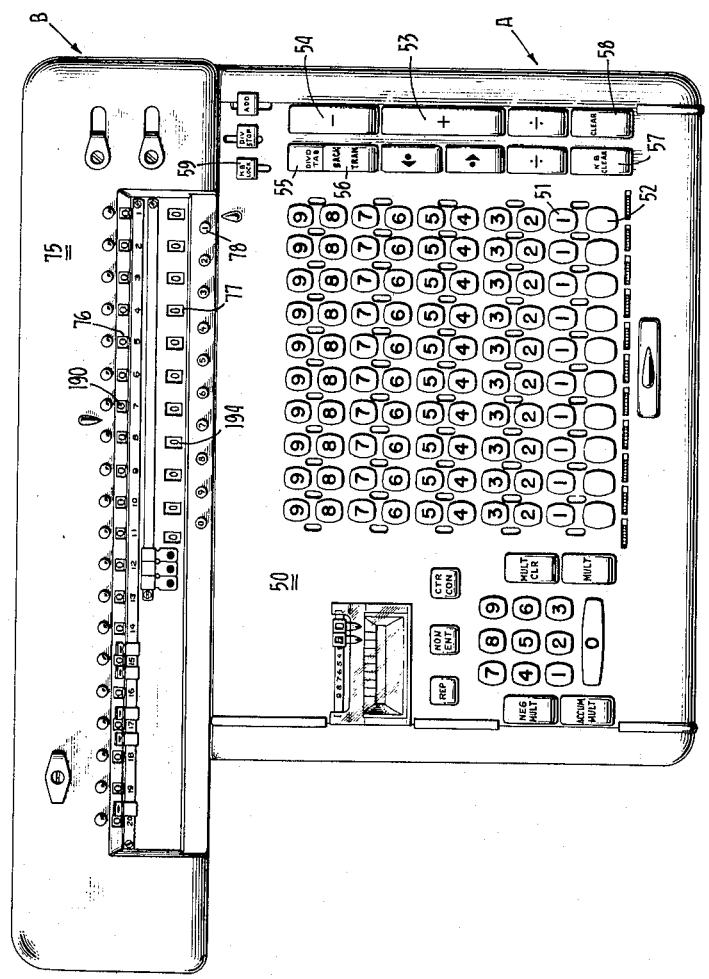
FIG_1

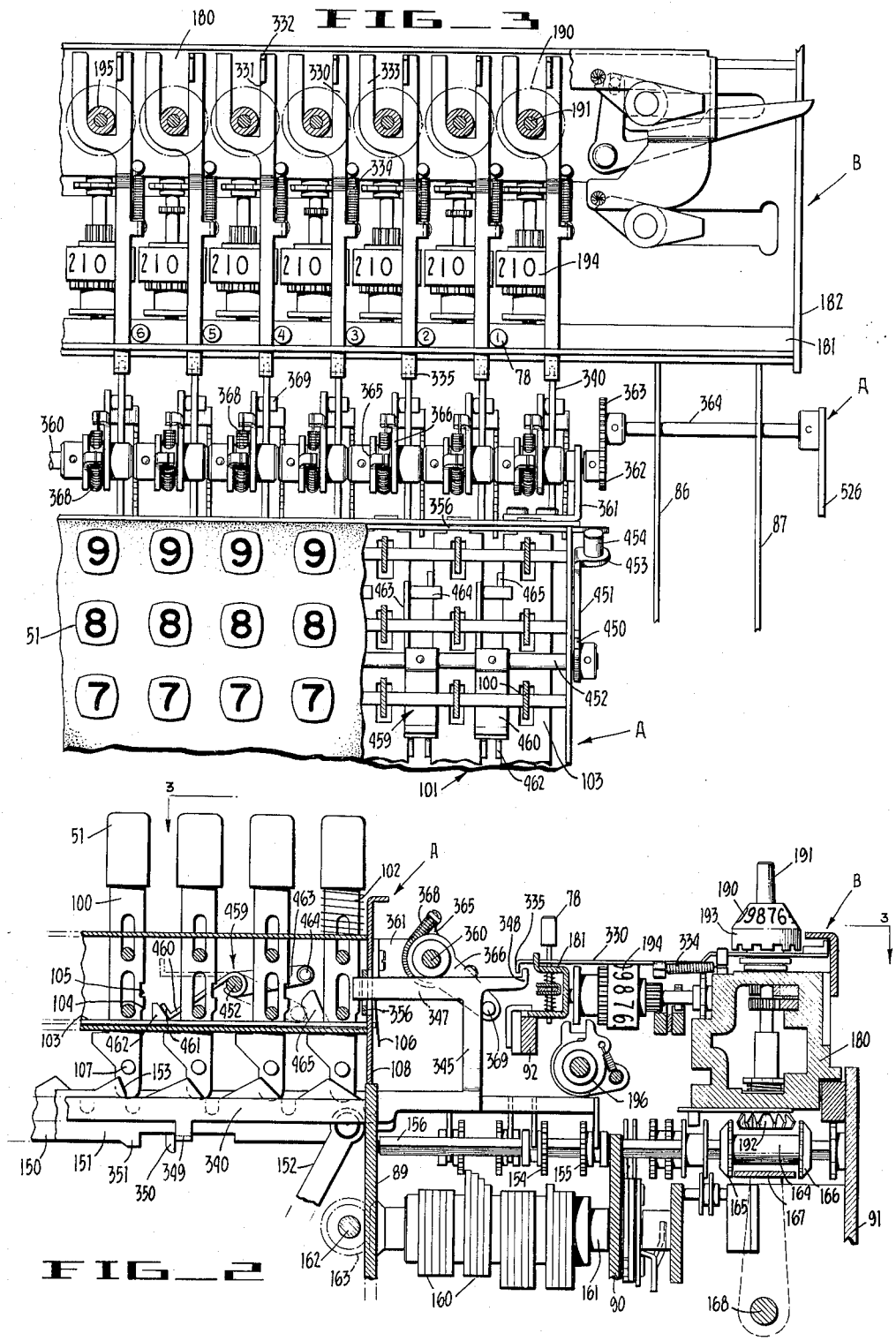

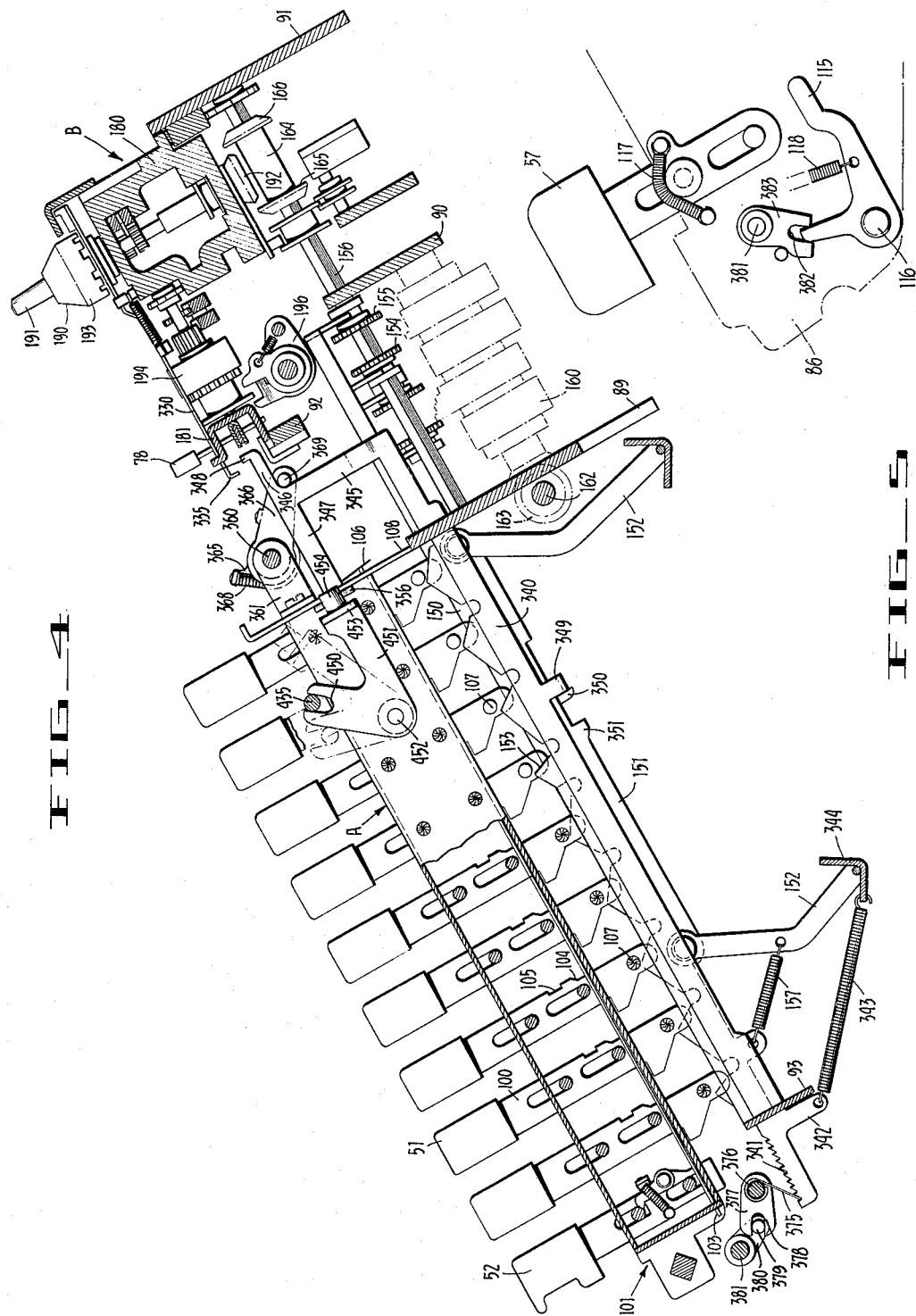

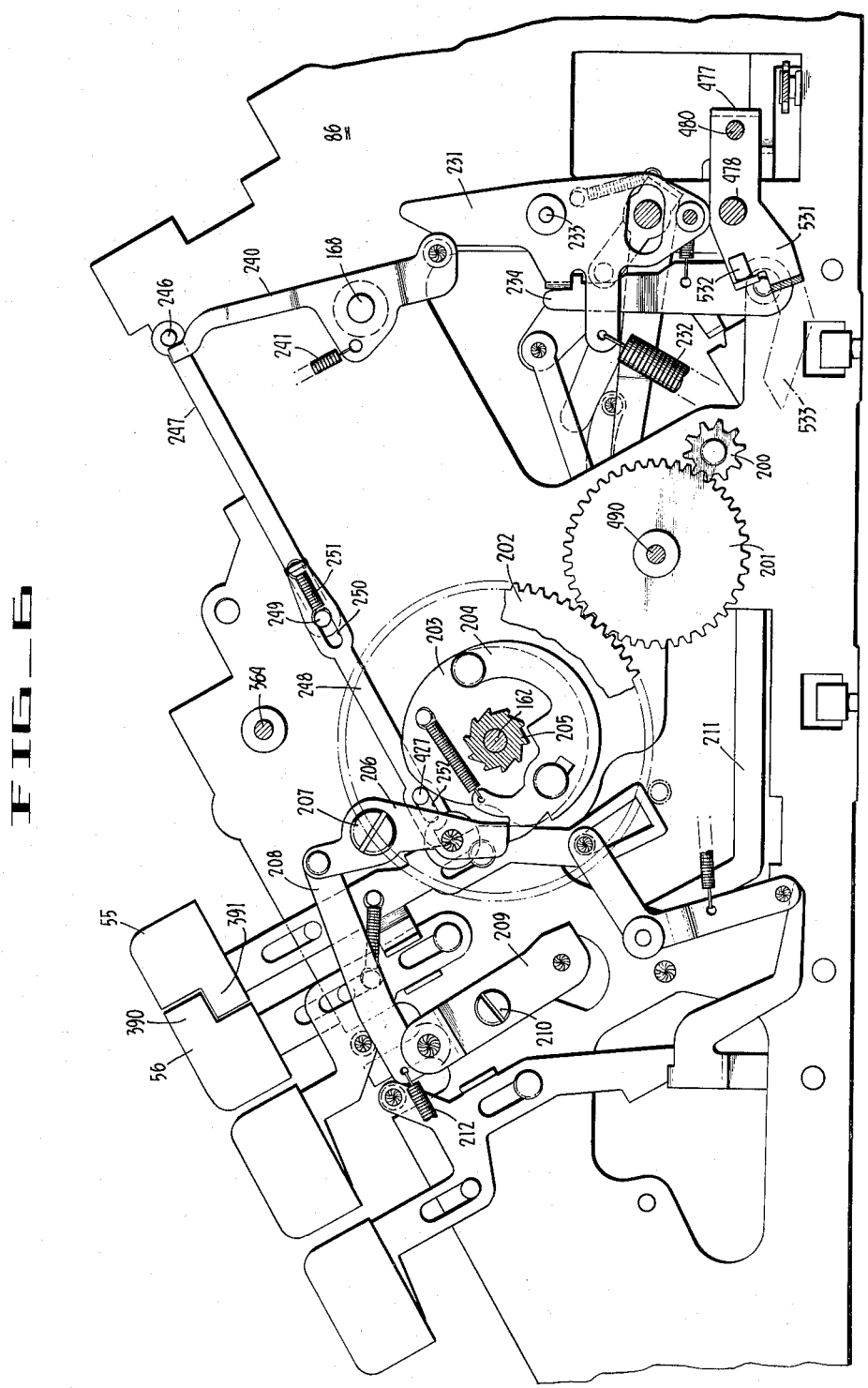

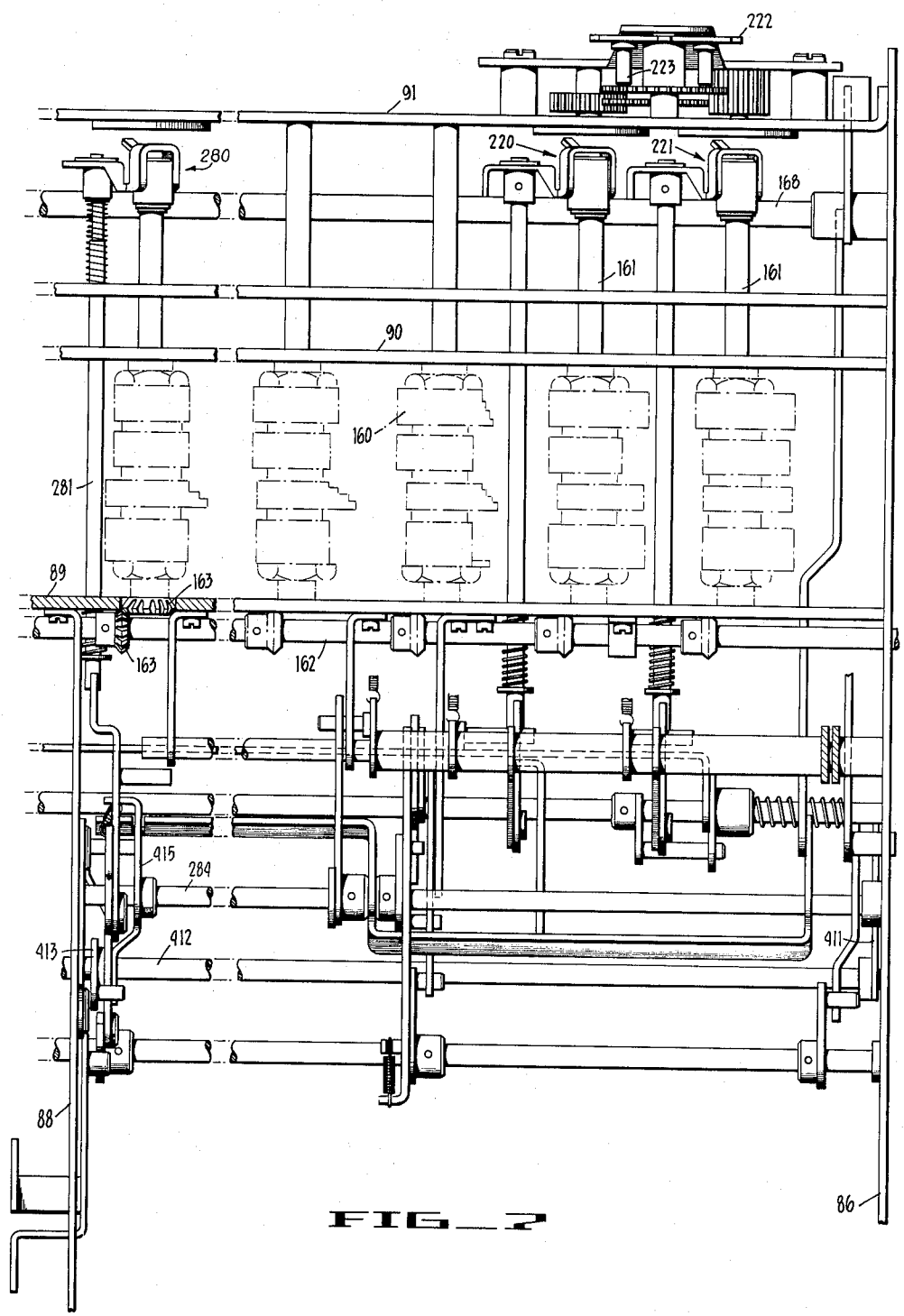
FIG_2

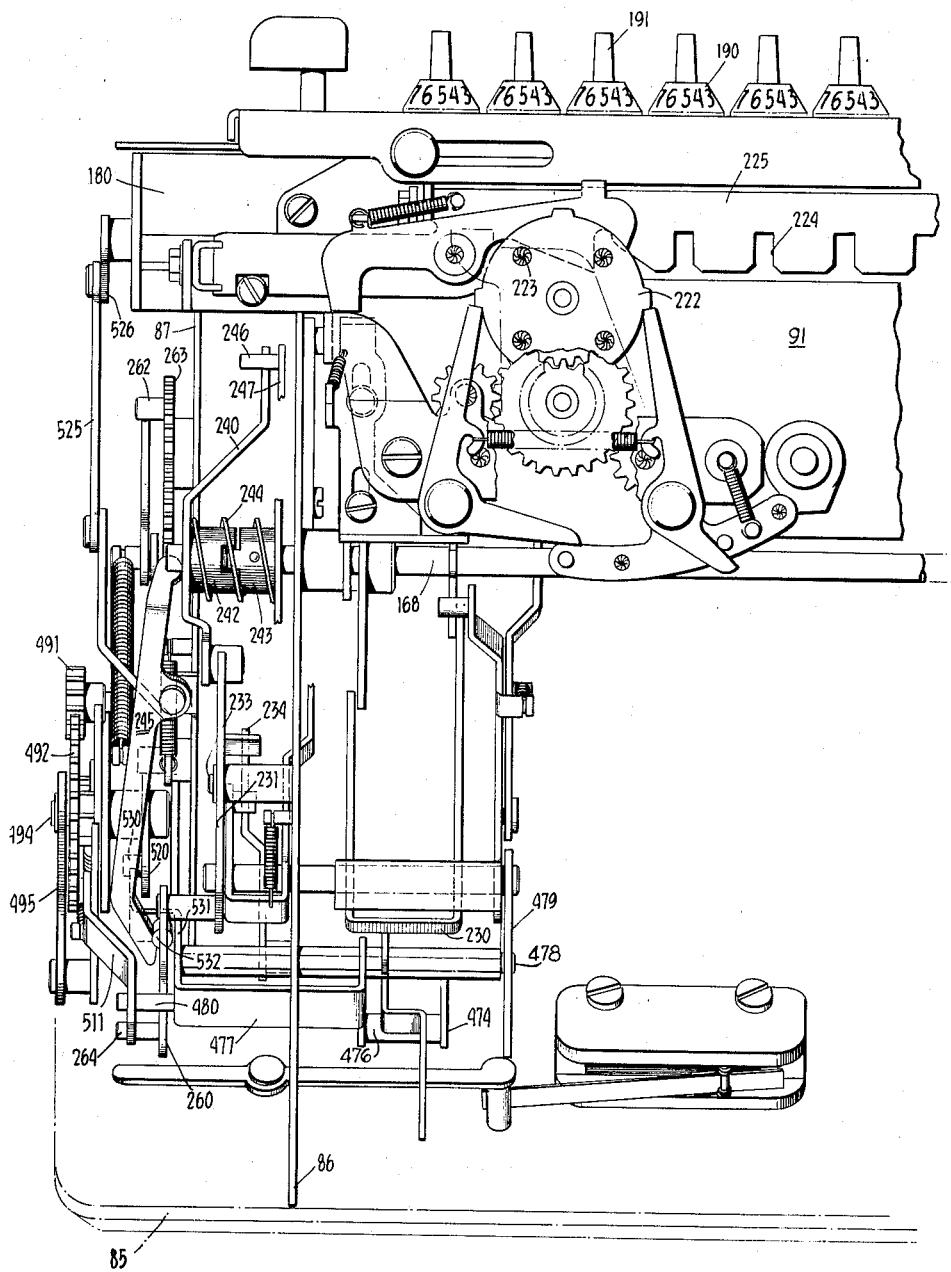
FIG_8

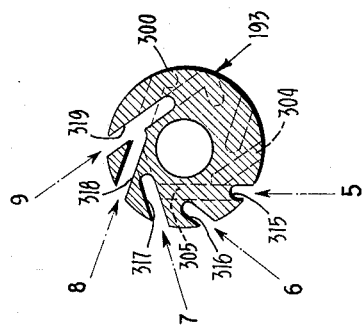

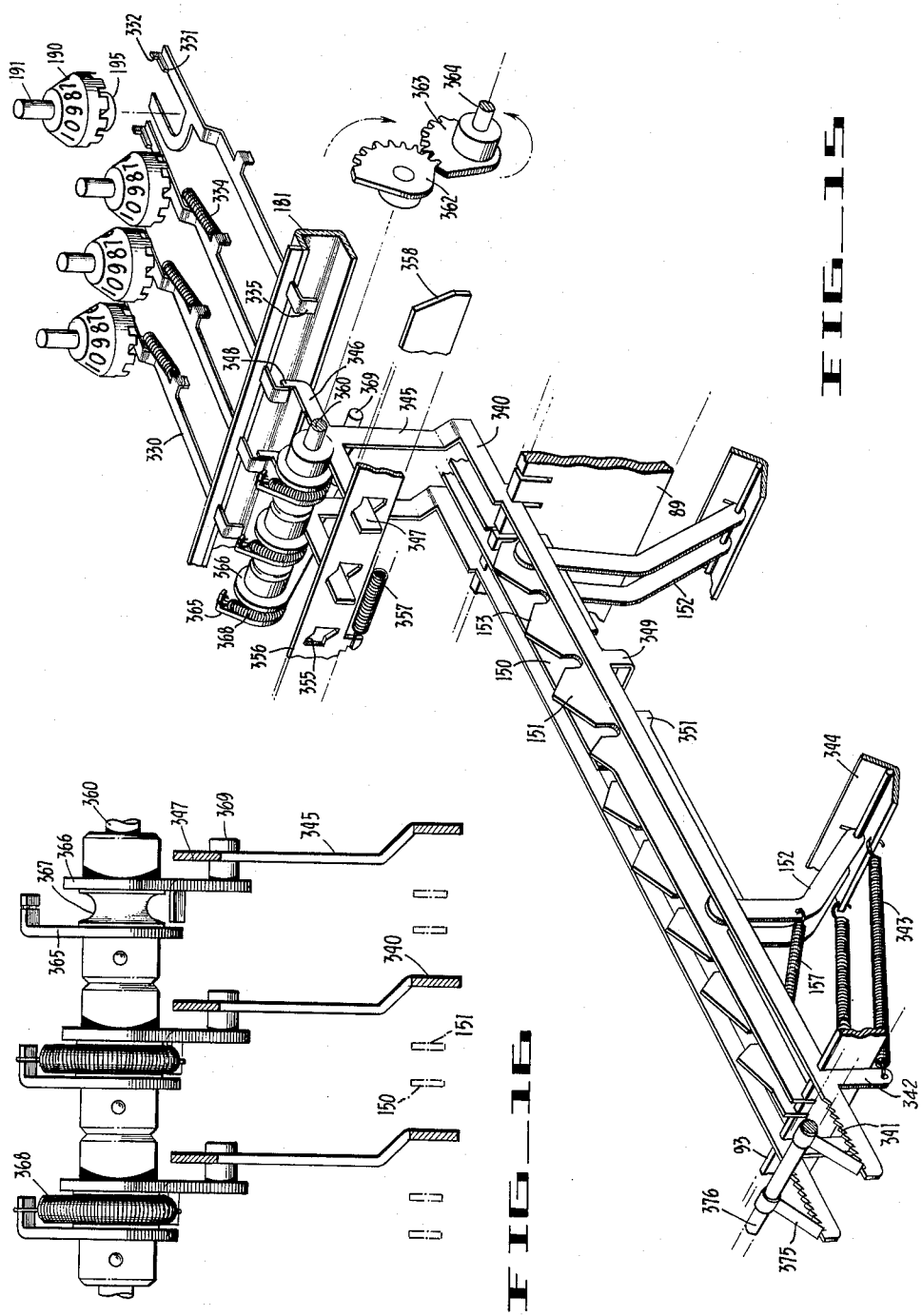

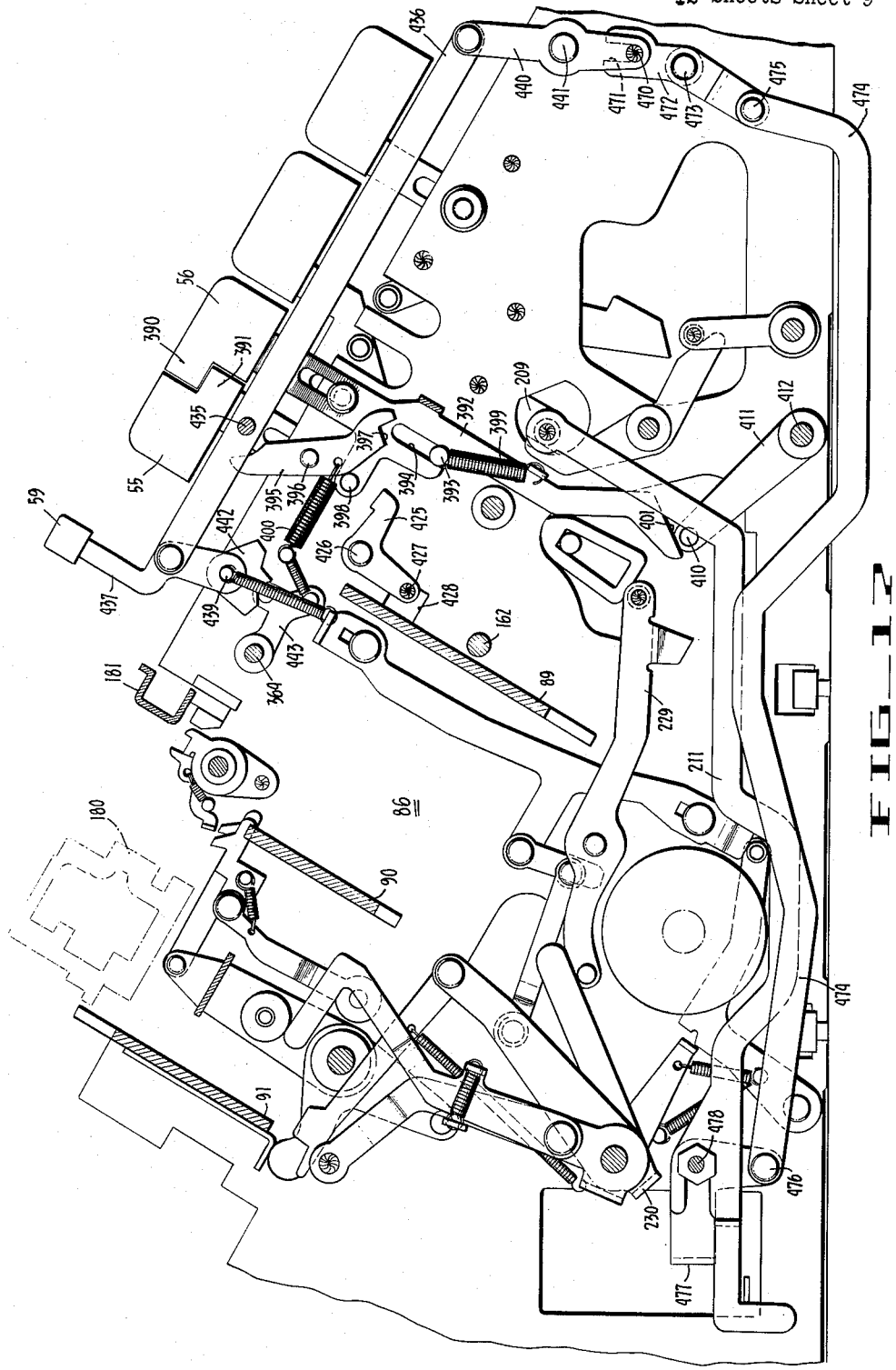

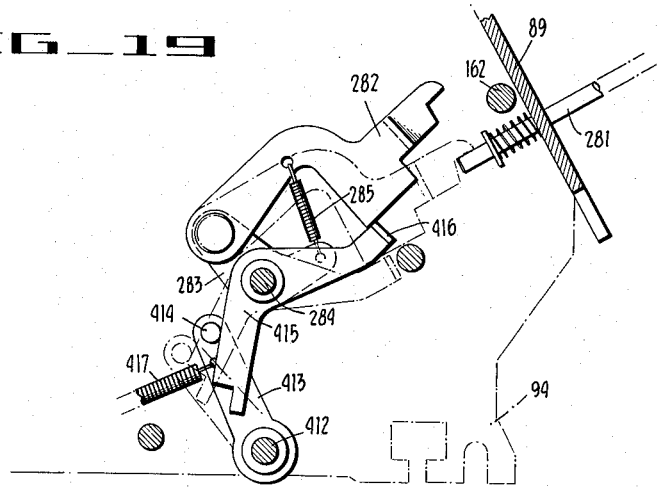
FIG_19
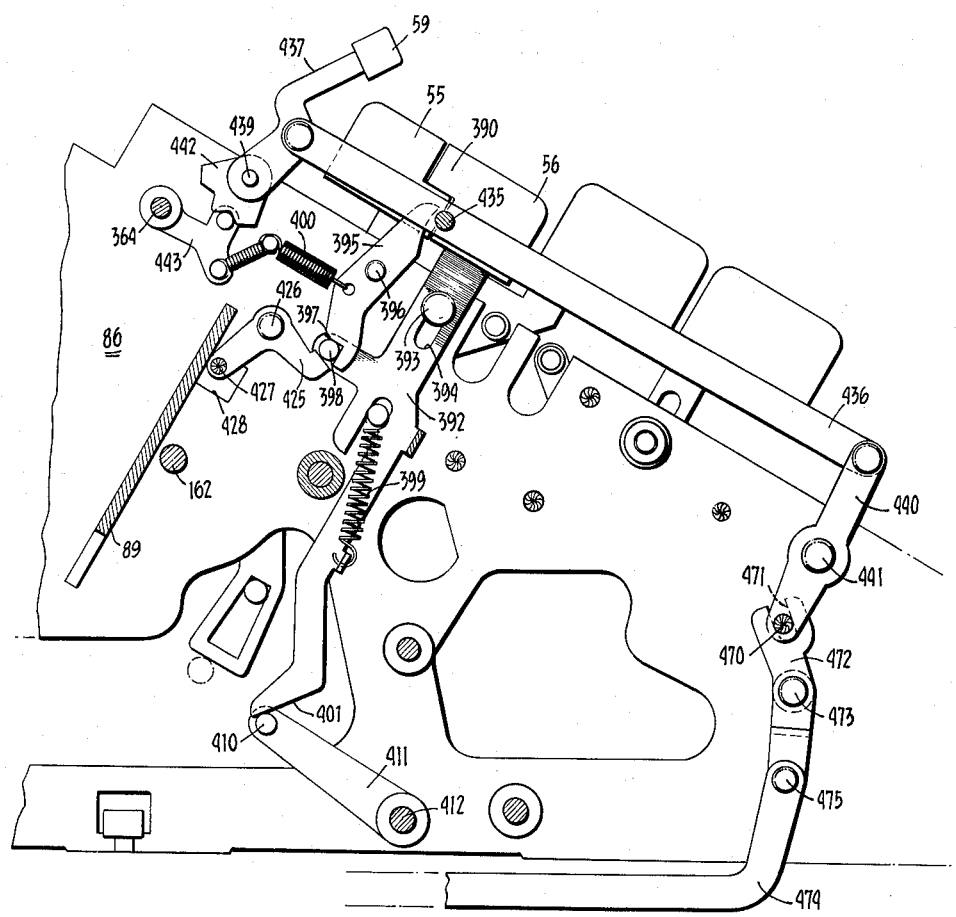
FIG_18

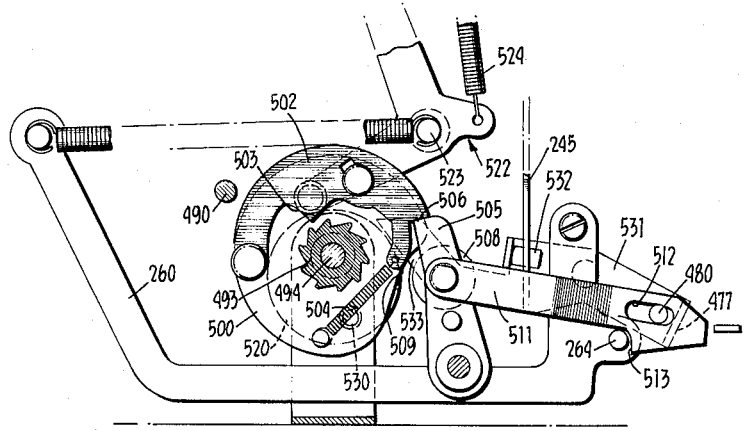
FIG_21
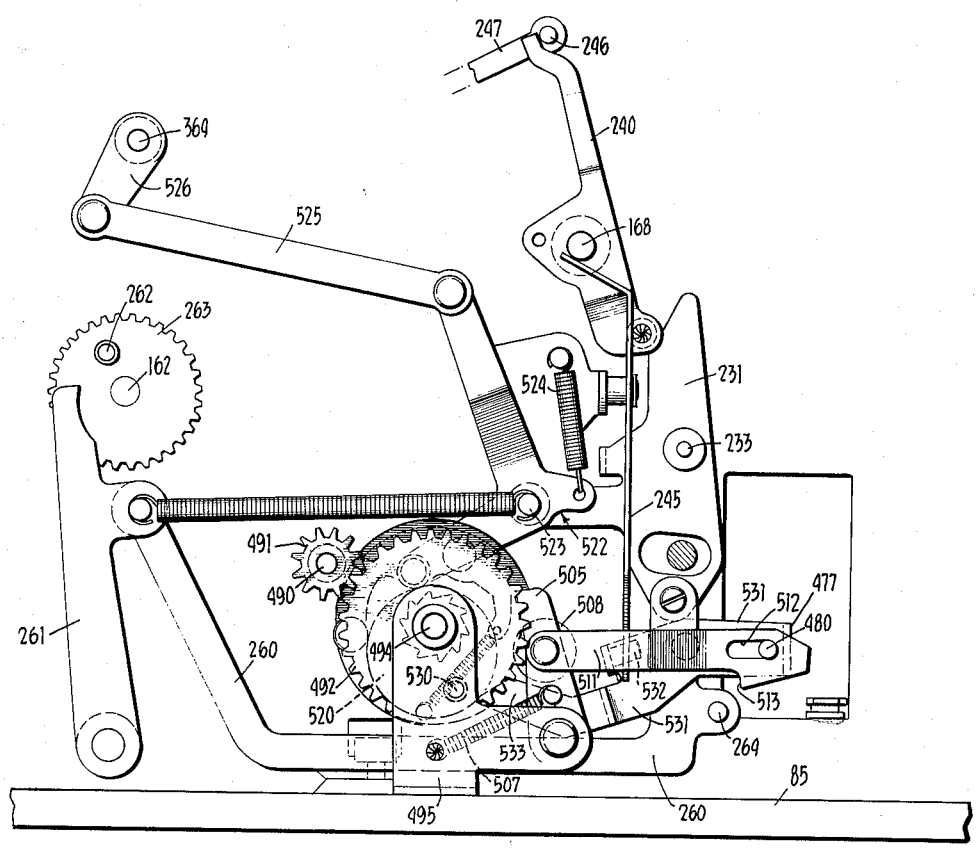
FIG_20

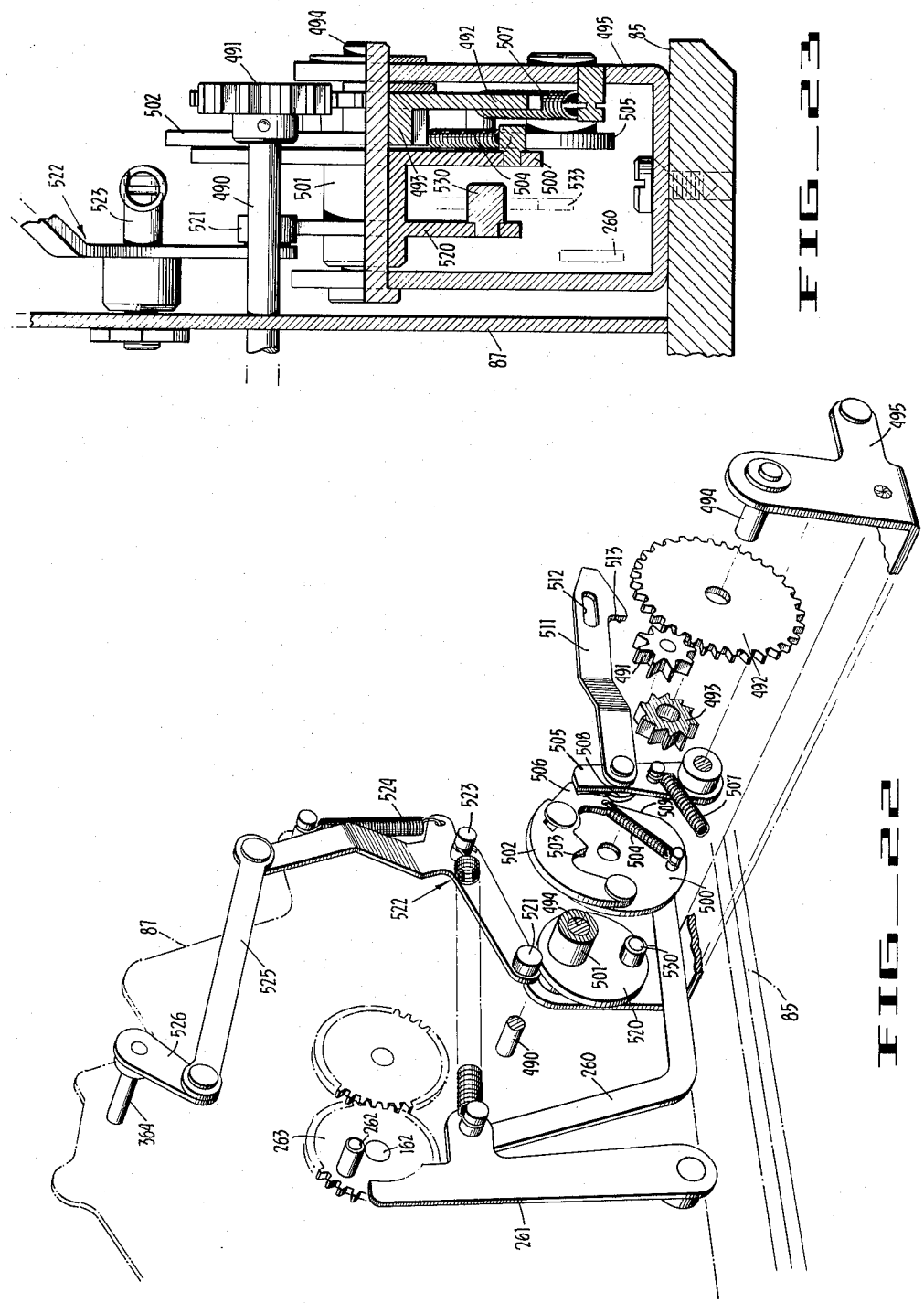

United States Patent Office 3,231,192
Patented Jan. 25, 1966

3,231,192
BACK TRANSFER MECHANISM FOR CALCULATING MACHINE
Grant C. Ellerbeck, San Leandro, Calif., assignor, by mesne assignments, to Friden, Inc., San Leandro, Calif., a corporation of Delaware
Filed May 31, 1963, Ser. No. 284,652
4 Claims. (Cl. 235—145)

TABLE OF CONTENTS

|  | Column |
|---|---|
| (I) Prior Art Mechanisms | 3 |
| (1) General Arrangement | 4 |
| (2) Keyboard | 5 |
| (a) Keyboard Clearing | 6 |
| (3) Selection Mechanism | 6 |
| (4) Actuator Mechanism | 6 |
| (5) Accumulator Mechanism | 7 |
| (6) Clutch and Drive Mechanism | 7 |
| (7) Carriage Shift | 8 |
| (8) Register Clearing | 8 |
| (9) Automatic Carriage Shifting | 9 |
| (II) Back-Transfer Mechanism | 11 |
| (1) Value Cams and Sensors | 11 |
| (2) Sensor Actuators | 13 |
| (3) Setting Selection Bars | 14 |
| (4) Back-Transfer Key | 15 |
| (a) Disable the Register Clearing Mechanism | 16 |
| (b) Disable Dividend Entry Latch | 16 |
| (c) Set Sensor Actuators | 17 |
| (d) Clear and Lock Keyboard | 17 |
| (e) Condition Auxiliary Drive Mechanism | 18 |
| (f) Restore Back-Transfer Key | 19 |
| (5) Auxiliary Drive | 19 |
| (6) Operation | 21 |

This invention relates to a calculating machine, and more specifically to a mechanism therein which is effective to transfer the value standing in the accumulator register into the selection mechanism.

It is one primary object of the present invention to provide what is often called a "back-transfer" mechanism for a calculating machine, i.e., a mechanism which can be selectively operated to transfer a value accumulated in the accumulator, or product register, back into the selection mechanism, after which it can be used as a factor in subsequent problems.

The preferred embodiment of my invention is illustrated in the drawings. It is obvious that it utilizes a calculating machine of the type disclosed in the patent to Carl M. Friden, No. 2,229,889, issued January 28, 1941, as modified by certain other patents specifically mentioned hereafter. The embodiment of the back-transfer mechanism shown and described herein provides for a mechanism which is simpler than those heretofore practical and it provides a mechanism which is operative in a single cycle of machine operation. Preferably, as is shown in my prior patent, No. 2,828,913 issued April 1, 1958, the operation of the back-transfer control key first initiates operation of the tabulating, or automatic carriage shifting, operation in order to align selected orders of the register with the keyboard before effecting the back-transfer operation. The preferred form of my invention provides that the factor so transferred into the selection mechanism will be held there until released by operation of the keyboard clearing mechanism—either from the operation depressing the customary keyboard key or by operation of the automatic cycle, or "ADD" key mechanism. Thus the value back-transferred into the selection mechanism can be used in repetitive operations, such as multiplication or division, or used only once, as desired by the operator.

It is an important object of my invention to provide a back-transfer mechanism of what is sometimes called the "sensing" type (i.e., one in which the register dials carry cams representative of the value to be transferred, which cams are sensed and some mechanism is utilized to set the value in the selection mechanism) in which the increments of motion of a value cam are equal to the increments of motion in the selection mechanism. In the commercial machine made under the Friden patent above-mentioned the normal increment of motion of the selection bars is .062 inch (roughly 1/16 inch) and the accumulator dials are set on 5/8 inch centers. In the past, cams of this type have utilized radial notches and the sensor used radial increments in sensing the value cam. With that type of operation, it is impossible to utilize increments of .062 inch in the cam and sensor when the center distance between adjacent accumulating dials is 5/8 inch. Therefore, in the past, the increments of movement of the sensor and the increments of movement permitted by the value cam have had to be greatly reduced and the motion of the sensor multiplied in setting the selection mechanism. The present invention is designed primarily to avoid this difficulty and to permit an incremental motion of a sensor equivalent to the incremental motion of the selection bars without increasing the spacing of the accumulator dial—in the instant machine, to enable nine increments of .062 inch from a "0" position on dials that are spaced 5/8 inch apart. This is readily accomplished by setting the sensing notches off-center so that the sensor moves along a chord of the dial adjacent the hub thereof rather than along the radius, as is customary in the art.

Another feature of the present invention is the use of a "two-story" cam in which one set of notches has one (vertical) depth and is sensed by one shoulder of the sensor, and another set of notches has a greater depth and is sensed by another shoulder of the sensor, whereby there are actually two sets of notches of a length increasing incrementally in five steps (from "0" to "4" and "5" to "9") and because of the difference in the depth of the two sets, each set is sensed by a different shoulder on the sensor.

Thus a primary object of the present invention is to provide a value cam which permits greater increment of depth in the differential positions of the accumulator dial than was heretofore possible, and thereby enables greater movement of a sensor than previously permissible—without changing the spacing of the dials.

The general object of the present invention is to provide a simple and relatively inexpensive mechanism which can be used to transfer a value from the product register into the selection mechanism where it can be held as long as desired and may be used as often as is required, and which is operative in a single cycle of machine operation. Incidentally, it can be mentioned that the mechanism for this purpose, for the most part, uses mechanisms and parts already found in the calculating machine mentioned, so that the parts therefor are inexpensive. Further, the preferred form of the invention can be added to the machine mentioned without changing its basic structure or requiring retooling or redesign thereof.

The present invention is concerned with these and other objects which will become apparent from perusal of the description of the preferred embodiment of the invention which is shown in the accompanying drawings and in which:

FIG. 1 is a plan view of the machine in which the present invention is preferably placed.

FIG. 2 is a longitudinal cross-sectional view through the rear part of the machine showing particularly the rear part of the selection mechanism and the keys therefor, the actuator and the accumulator register.

FIG. 3 is a plan view of the mechanism shown in FIG. 2 such as taken along the planes indicated by the lines 3—3 of FIG. 2.

FIG. 4 is an extended view similar to FIG. 2, and shows additional operating mechanisms of the present invention.

FIG. 5 is an enlarged detail showing the keyboard clear key and some of the mechanism operated thereby.

FIG. 6 is a right side view of the right-hand frame plate showing particularly the drive mechanism and a portion of the automatic shifting mechanism.

FIG. 7 is a cross-sectional plan view showing the location of the actuators and the means for shifting the carriage and clearing the registers.

FIG. 8 is a partial rear view of the machine, with the cover removed, showing the shifting mechanism and a portion of the automatic shifting controls, together with part of the back-transfer drive means of the present invention.

FIG. 9 is a side view of one of the register dials of the machine with which the present invention is preferably associated, showing the value cam at the base thereof and the sensor which co-operates with the value cam.

FIG. 10 is a cross-sectional plan view of the lower part of the value cam, such as taken on the plane indicated by line 10—10 of FIG. 9.

FIG. 11 is a second cross-sectional plan view of the value cam taken on a plane slightly above that shown in FIG. 10, as on the plane indicated by the line 11—11 of FIG. 9.

FIGS. 12 to 14, respectively, show the position of the value cams for the values of "1," "5" and "9," respectively, and show in phantom lines the operative positions of the sensor when sensing such values.

FIG. 15 is a perspective view, taken from the right side and front of the back-transfer mechanism, including the value cams, the sensors therefor, the back-transfer setting bar which sets the values in the keyboard, and the means for operating the latter.

FIG. 16 is a partial front view of the mechanism shown in FIG. 15.

FIG. 17 is a left side view of the mechanism mounted on the right-hand frame plate, showing particularly the customary automatic shifting mechanism and certain controls relating to a back-transfer operation.

FIG. 18 is a partial view of some of the control mechanism shown in FIG. 17, and shows the back-transfer key depressed, and the parts controlled thereby in their operated positions.

FIG. 19 is a detail showing means operated from depression of the back-transfer key for disabling the register clearing mechanism.

FIG. 20 is a right side view of the auxiliary clutch which operates the back-transfer mechanism, mechanism operated thereby, and means for operating the clutch shown (all shown in the normal and inoperative position).

FIG. 21 is a view similar to FIG. 20 of the auxiliary clutch-operating mechanism, showing the parts when the back-transfer clutch is conditioned for operation by the operation of the back-transfer control key.

FIG. 22 is an exploded prespective of the auxiliary or back-transfer clutch, the means for operating it and the linkage operated thereby.

FIG. 23 is a front view, partially in cross-section, showing the auxiliary clutch and the linkage operated thereby.

(I) PRIOR ART MECHANISMS

The present invention is applied, for purposes of exemplification, to a calculating machine of the general type shown and described in the patent to Carl M. Friden No. 2,229,889, issued January 18, 1941. This basic construction preferably has been modified and improved by the mechanism shown in the patent of Elwood A. Davis of July 26, 1960, No. 2,946,505, relating to the automatic clearing of the registers in any ordinal position thereof; the patent to Malavazos et al., of March 1, 1960, No. 2,926,846, relating to the direct automatic tabulation of the carriage with respect to the selection mechanism; and other patents not here pertinent.

Reference, perhaps should also be made to the patent of Malavazos, No. 3,045,907 of July 24, 1962, as I prefer to use, and have shown herein, the following mechanisms which are taken substantially without change from the machine theredescribed: The keyboard assembly and some of the control mechanisms associated therewith, such as keyboard clearing; and the modified carriage tabulating, or automatic shifting, mechanism necessary to selectively effect a dividend entry or a back-transfer operation, the latter utilizing the engagement of an auxiliary clutch which operates the back-transfer mechanism when the carriage has been shifted to the selected ordinal position.

It will be understood, however, that the invention is not limited to incorporation in that particular machine, for it can be incorporated in, or applied to, other calculating machines on the market, or could use other selection, tabulating, and operating mechanisms. Specifically, while it is contemplated that the present invention will be associated with a mechanism for automatically aligning the accumulator with the selection mechanism, it will be obvious to those familiar in the art that such an automatic carriage shifting, or "tubulating," operation is not essential to the invention herein described. Further, I have not shown storage dials for indicating the value stored, but it is obvious that such a mechanism is contemplated as part of a commercial machine— and such mechanisms are old, as shown in the patents to Friden, No. 2,325,388; Malavazos, Nos. 2,909,320 and 3,045,907; and my patents, Nos. 2,714,989, 2,828,913 and 3,003,690. It is, therefore, to be understood that the machine shown in the accompanying drawings and described herein is for purposes of exemplification only and that the invention is not limited thereto.

(1) General arrangement (FIGS. 1, 2, 4, 6 to 8, 19 and 23)

It is customary for calculating machines to comprise a frame, or body portion, A upon which is mounted a register carriage B, the latter being ordinally shiftable in either direction with respect to the body portion A. The body portion A is provided with a cover 50 through which project the various keys, such as the value keys 51 and the ordinal clearing, or "0," keys 52 which constitute the main keyboard. Arranged to the right of the main keyboard are various control keys, such as a plus bar 53, a substraction key 54, a dividend entry key 55, a back-transfer initiating key 56, a keyboard clearing key 57, a register clearing key 58, and a back-transfer stop key 59. The machine used for exemplification also normally includes a number of other control keys, including those relating particularly to multiplication and division operations, which are not necessary to an understanding of the present invention and which will, therefore, be ignored herein.

A cover 75 of the carriage B contains a plurality of ordinally arranged windows 76 through which are visible the accumulator, or product register, dials 190; and another series of ordinally arranged windows 77 through which are visible the counter, or quotient register, dials 194. In the preferred machine, the carriage will also contain a plurality of ordinally arranged tabulator buttons 78 which control the ordinal position to which the carriage will be automatically shifted in certain operations, one of which will be described hereinafter.

The operating mechanism of the machine is, for the most part, supported upon a main frame which includes a base 85 (FIG. 8), right side frame 86 (FIGS. 6, 7 and 8), a right side control plate 87 (FIGS. 8 and 23), an intermediate frame plate 88 (FIG. 7) and a left side frame plate 94 (FIG. 19) lying to the left of the intermediate plate 87. The rear portions of the two side frames 86 and 94 and the intermediate plate 88 are interconnected and braced by a crossbar, or front bearing plate, 89 (FIGS. 2, 4 and 7) and crossbars 90, 91 and 92, which provide additional strength and bracing to the side frames as well as serve as bearing plates for various mechanisms. Similarly, the front portion of the machine is braced by a crossbar 93 (FIG. 4) which extends between the right frame plate 86 and the intermediate, or auxiliary, frame plate 88. Most of the operating parts of the machine are mounted upon this frame and particularly, insofar as the present invention is concerned, upon the right side frame 86.

It should be mentioned that, for the sake of brevity, many mechanisms which are customary in machines of this kind, such as the multiplying mechanism, the division mechanism, power controls, and the like, are not described herein as they are not pertinent to the present invention. Those parts which are commonly found in machines of the type shown herein, or have been described in the various patents mentioned, and which indirectly relate to the operation of the present invention, will be described as briefly as possible; and those mechanisms which are directly related to the operation of this invention will be described somewhat more in detail. It will be understood, therefore, that I assume that my invention will be associated with a fully automatic calculating machine which has the usual features such as those mentioned, but that, for the sake of brevity, I will limit my description of known elements to those which directly or indirectly relate to the operation of my machine or to those mechanisms which must be modified in their operation in order to provide for the most satisfactory operation of the mechanism of my invention.

(2) Keyboard (FIGS. 2, 3 and 4)

Preferably the keyboard of the present machine is that disclosed in FIGS. 3 to 5 of the Malavazos patent, No. 3,045,907, previously mentioned. The keys 51 are mounted on key stems 100 (FIGS. 2, 3 and 4) which are slidably mounted in a keyboard frame 101. The individual keys are resiliently biased to a raised position by means of compression springs 102 placed around the upper part of each key stem and seated against the top of the keyboard frame and the bottom of the key top. A depressed key is latched in an operative position by means of an ordinal latch slide 103, slots of which encompass each key stem. Each key carries a cam nose 104 which, when the key is depressed, moves the latch slide 103 rearwardly to release a depressed key of that order. When the key is depressed to its fully operative position, a notch 105 registers with the latching slide, whereupon the latching slide snaps forwardly under the force of its spring 106 mounted on the rear end plate 108 of the keyboard frame 101 to latch the key in the depressed position. Each key stem carries a pin 107 riveted thereon adjacent its lower end, which pin engages the associated cam face of a selection bar described more in detail in section (3), "Selection mechanism," below.

The ordinal "0," or clearing, key 52 (FIG. 4) is aligned with each order of value keys 51. The stem of this key is provided with a cam nose, similar to nose 104, of the value keys, for forcing the latching slide 103 rearwardly to release any latched key of that order. However, the "0" key has no latching notch, so that it cannot be latched in its depressed position. This key also serves as an ordinal keyboard lock if the key is lifted rather than depressed, as suggested by the patent to Friden et al., No. 2,346,834 of April 18, 1944, but as that mechanism is not pertinent to the present invention it will not be described although it is shown in this figure.

(a) *Keyboard clearing*.—The entire keyboard can be cleared by the operation of the keyboard clear key 57 (FIG. 1). It has already been mentioned that a key which has been latched in a depressed position can be released by operation of any other key in that order or by depression of the co-ordinal "0" key 52. However, it is often desirable to release several orders simultaneously, so that a single key 57 is provided to accomplish this purpose. The key 57 is normally mounted on the right side frame 86 (see FIG. 5) for vertical movement and is resiliently biased to a raised position, as by spring 117. Its lower end overlies a bellcrank 115 which is rigidly mounted on a clearing shaft 116 and is resiliently biased to the inoperative position shown in FIG. 5 by a spring 118. It is apparent that the depression of the clear key 57 will rock the shaft 116 (clockwise in FIG. 5). The rocking of this shaft is utilized to shift the latching slides 103 rearwardly to release all keys of the keyboard which may be depressed by a mechanism described in the patent to Malavazos, No. 3,045,907. Reference is, therefore, made to that patent for further disclosure of this mechanism. This much of the clearing mechanism has been mentioned, however, as in my preferred form of invention I utilize the operation of the keyboard clear key 57 to release the factor which has been transferred from the accumulator register into the selection mechanism when that is desirable, and this operation will be effected by the rocking of shaft 116, as will be explained in section (II), under the heading "(2) Sensor actuators."

(3) Selection mechanism (FIGS. 2, 4 and 15)

The selection mechanism preferably is that shown in the Friden patent, No. 2,229,889, previously mentioned. It comprises a pair of V-notched selection bars 150 and 151 for each order of the keyboard, the bar 150 serving the "1" to "5" keys and the bar 151 serving the "6" to "9" keys, as is customary in that machine. Each of these bars is individually mounted on a pair of struts 152 and each is provided with differentially sloping V-notches, or cam faces, 153 adapted to be engaged by the pins 107 of the respective value keys. Each bar is provided at its rear end with a perpendicularly extending yoke adapted to engage an annular notch in the collar of a respective selection gear 154 or 155, respectively. Each ordinal pair of these gears is mounted on a common selection, or square shaft, 156, all of which are journalled in the crossbars 89, 90 and 91. It is obvious that the depression of the various value keys 51, through the action of the pin 107 on the associated cam face 153, will translate a selection bar 150 or 151 forwardly an amount determined by the key depresed. Such translation of the selection bar moves the related selection gear 154 or 155 axially along the square shaft a corresponding differential amount. When the various keys are latched in an operative, or lower, position, the key holds the corresponding selection bar in the adjusted position against the force of a light spring 157 (FIGS. 4 and 15) which normally biases the selection bars to a "0," or inoperative, position.

(4) Actuator mechanism (FIG. 2)

The actuating mechanism preferred is that of the well-known Thomas-type machine, such as described in the Friden patent, No. 2,229,889, above-mentioned. Briefly it comprises an actuator drum 160 for each order of the machine. These drums are composed of teeth of differing lengths, so that the differential positioning of the selection gears 154 or 155 will place the gear in alignment with the number of teeth corresponding to the value of the key. In the preferred construction, a pair of actuator drums is mounted on a common shaft 161 so as to serve a pair of orders. These shafts and the accumulator drums are driven from a common drive shaft 162 by means of respective pairs of miter gears 163. It is obvious that the rotation of the main drive shaft 162 will drive all of the actuator drums 160, thereby imparting increments of rotational movement to the ordinal square shafts 156 dependent upon the position of one or the other of the co-ordinal selection gears 154 or 155.

This differential rotational movement is used to rotate the accumulator dials through the medium of a digitation control spool 164 slidably mounted on the rear end of each square shaft. Each of these spools carries an additive gear 165 and a substractive gear 166, both of which are adapted to register with a co-ordinal accumulator gear 192. Digitation control spool 164, and hence the additive and substractive gears 165 and 166, are positioned by means of a bail 167 which is carried by a digitation control shaft 168. By means of controls not here pertinent, the shaft 168 can be rocked to position the digitation control spool 164 to enter a value determined by the setting of the selection mechanisms additively or substractively into the accumulator dials 190 at the will of the operator.

(5) *Accumulator mechanism (FIGS. 2, 3 and 4)*

The accumulator register is mounted in the framework of the shiftable carriage B as best shown in FIGS. 2 and 4. The carriage comprises a main frame bar 180 and a front rail 181 held in properly spaced relationship by a pair of end plates 182.

The product register comprises a series of ordinal dials 190, each of which is mounted on the upper end of a dial shaft 191. The dial shafts are journalled in the carriage frame bar 180, the dials lying above the frame bar and being viewable through the windows 76 in the carriage cover 75 (FIG. 1). The accumulator gear 192 (FIGS. 2 and 4) is mounted on the lower end of each dial shaft 191 below the bottom of the frame bar, which gear is adapted to be driven by either the additive gear 165 or the substractive gear 166 already mentioned. In the present invention each dial shaft 191 carries a value cam 193 rigidly secured thereto and preferably formed integrally with, or attached to, the co-ordinal dial 190. This cam will be described more in detail hereafter in section (II), subsection (1), entitled "Value cams," as they relate specifically to the back-transfer mechanism. However, it can be noted at this point that in the present invention each dial carries, directly or indirectly, a value cam 193.

It will be understood that the accumulator register dials 190 are provided with a tens-transfer mechanism, which preferably is of the well-known construction shown in the Friden patent heretofore mentioned. Since the tens-transfer mechanism is not utilized in the back-transfer operation of the present invention, it will not be described. Likewise it will be understood that the carriage B carries a plurality of ordinally arranged counter dials 194, previously mentioned, which are viewable through the windows 77 (FIG. 1) in the carriage cover 75. The counter, likewise, plays no part in the present invention, so that its construction and operation by a well-known actuator 196 will not need to be described.

(6) *Clutch and drive mechanism (FIG. 6)*

In the preferred embodiment of my machine the various mechanisms are driven by an electric motor (not shown) which, through pinion 200 (FIG. 6) and idler 201, drives a clutch driving gear 202 that is rotatably mounted on the drive shaft 162. Adjacent the gear 202 is a clutch plate 203 rigidly secured to the drive shaft 162. A clutch dog 204 on the clutch plate 203 is resiliently biased into a ratchet gear 205 carried by the driving gear 202 to drive the driven plate 203 and hence drive shaft 162. This type of clutch is so well-known that it will not be further described.

It is important to note that the position of the clutch dog 204 is controlled by a pawl 206 which is rotatably mounted on the side frame 86 by any suitable means, such as a pivot stud 207. A link 208 connects the upper end of the pawl to a two-armed lever 209, also pivotally mounted on the frame plate 86 by any suitable means, such as pivot stud 210. A switch control link 211 is pivotally connected to the lower end of the lever 209, so that the rocking of either the lever 209 or the pawl 206 (clockwise in FIG. 6) pulls the switch control link 211 forwardly and thereby closes the motor switch. The important thing to notice in connection with this mechanism is that the operation of either the clutch or the switch simultaneously operates the other. Normally, however, the mechanism is held with the clutch pawl 206 engaging the clutch dog 204, and hence holding the clutch disengaged and the motor switch open, by a suitable spring 212 tensioned between the link 211 and a suitable stud on the frame plate (not shown).

(7) *Carriage shift (FIGS. 7 and 8)*

It has previously been mentioned that the carriage B (FIG. 1) is shiftable in either direction with respect to the frame A of the machine. This shifting can be controlled by power from the operation of the manually operated shift keys shown in FIG. 1 and also in certain automatic operations, one of which will be described in section (9) below.

The mechanism for shifting the carriage is shown particularly in FIGS. 7 and 8, and is essentially that shown and described in the patent to Friden et al., No. 2,380,642 issued on July 31, 1945 as modified by the clutch mechanism shown in the patent to Matthew, No. 2,679,916 issued June 1, 1954. The mechanism has been described so often that it will not now be described in detail. It is believed sufficient to note that a leftward shifting of the carriage is secured by operation of a left shift clutch 220 (FIG. 7) and right shifting is controlled through a right shift clutch 221. Both operate through gearing shown (but not identified) to rotate a shift plate 222 in either direction as desired. Forwardly extending pins 223 on the plate 222 engage notches 224 (FIG. 8) formed in a shift rack 225 mounted on the carriage frame bar 180. By means of this mechanism, a shift of one ordinal space in either direction is accomplished in each cycle of machine operation. If further description of this mechanism is desirable, reference is made to the patents above-mentioned in this paragraph, or to Malavazos, No. 3,045,907 of July 24, 1962, where this shifting mechanism is more fully described.

(8) *Register clearing (FIGS. 7 and 19)*

It is customary to provide the machine of the patents above-mentioned with a power-operated register clearing mechanism. This mechanism is not directly concerned with the operation of the present invention and, therefore, need not be described in detail. However, it should be noted that in the operation of the back-transfer mechanism of my invention I must disable the register clearing mechanism which is normally operated from depression of the dividend entry key 55 (FIG. 1). The register clearing operation is controlled by the operation of a clearing clutch 280 (FIG. 7), the operation of which is controlled by a clutch control rod 281 (see also FIG. 19). Operation of this rod is controlled by a link 282, the front end of which is pivotally mounted on an arm 283 carried by shaft 284. The rear end of the link 282 is formed with a shoulder adapted to engage the front end of rod 281, and is resiliently biased into engagement with the rod 281 by any suitable means, such as spring 285. It is important to note that the rear end of the link 282 can be lifted so as to avoid operating rod 281 when the shaft 284 is rocked, as it normally is in a dividend entry operation. If further explanation of this mechanism is needed, reference can be made to the patent to Davis et al., No. 3,032,263 of May 1, 1962, or Malavazos, No. 3,045,907 mentioned above.

(9) Automatic carriage shifting (FIGS. 6, 8 and 17)

The preferred embodiment of my invention includes an automatic shifting, or as it is sometimes called, a "Carriage Tabulating" mechanism. This is a mechanism for automatically shifting the carriage to a preselected ordinal position in certain operations, such as the entry of a dividend. In the past, such mechanisms were used to shift the carriage to a desired ordinal position and thereupon enter a dividend into the accumulator, such as is shown in the patent to Carl M. Friden et al., No. 2,403,273 of July 2, 1946. In the present invention it is desired to use the automatic shifting mechanism of prior machines (described in the Friden patent) but to block the clearing of the register as, obviously, the register must not be cleared prior to the transfer operation.

It will also be realized that in the dividend entry mechanism of that patent, means was disclosed for the entry of the keyboard factor into the register as soon as the carriage had reached the desired ordinal position. However, in a back-transfer operation it is necessary to either clear the keyboard prior to the tabulating operation or to disable the entry of the keyboard factor into the accumulator—or, preferably, to do both. In my preferred form of invention I will use this tabulating mechanism to shift the carriage to the desired ordinal position; will disable the register clearing mechanism; and will disable the operation of the mechanism which would insert a keyboard value into the accumulator register if a value were standing in the keyboard.

It will be understood that the automatic shifting mechanism described in the Friden patent just mentioned could be replaced by some other suitable mechanism, such as that shown in the Malavazos et al. patent, No. 2,926,846, issued March 1, 1960, or even that the automatic shifting mechanism be eliminated entirely. It is not essential to a back-transfer operation that the carriage be automatically shifted to a desired ordinal position, but such a mechanism does provide the desirable feature of automatic transfer of selected orders of the register value into the selection mechanism, around a preselected decimal point, and from the operation of a single back-transfer key, which is effective to both initiate the automatic shifting and the back-transfer operations.

It is customary, as shown in the patents of Friden et al., No. 2,403,273, and Malavazos et al., No. 2,926,846, to provide a series of ordinally spaced tabulator buttons, or keys 78 (FIG. 1), to enable the operator to select the predetermined ordinal position to which the carriage is to be shifted. In view of the fact that these keys and their associated mechanisms have been described in detail, it is deemed necessary to describe them again. It should be noted, however, that the automatic shifting operation is normally initiated by the depression of the dividend entry key 55 which, through the linkages shown in FIGS. 6 and 17 but not specifically identified, is effective to initiate machine operation. The depression of the back-transfer key 56 is effective to rock a lever 229 (FIG. 17) which, in turn, rocks a bail 230 (which corresponds to the bail 186 shown in FIGS. 13, 15 and 16 in the patent to Friden et al., No. 2,403,273). The bail 230 is rocked (counter-clockwise in these figures) to initiate the automatic tabulating operation. The means by which the rocking of the bail operates the various mechanisms has been adequately described in the two patents above-mentioned and it is, therefore, deemed unnecessary to repeat the description of these mechanisms.

It should be noted, however, that in the operation of the dividend entry mechanism, the shifting of the carriage B into the preselected ordinal position determined by depression of one of the tabulator buttons 78, is effective to unlatch an operating hammer 231 (FIGS. 6 and 8). This hammer is rotatably mounted on a pivot stud 233 and is strongly biased by the force of a strong spring 232 to an operative position (counter-clockwise from that shown in FIG. 6). The hammer 231 is held in an inoperative position by means of a latch 234, the latch being operated during the cycle of operation in which the carriage is shifted to the preselected ordinal position.

Normally the operation of the hammer is effective to rock a two-armed lever 240 which is pivotally mounted on the shaft 168. This lever 240 is biased into engagement with the cam face at the upper end of the hammer 231 by any suitable means, such as spring 241. Normally the lever 240 is clutched to the shaft 168 by means of the jaw clutch 242, 243 (FIG. 8), the one portion being rigidly attached to the lever 240 and the other pinned to the shaft 168. The jaw clutch is biased to an open, or inoperative, position by a compression spring 244 which embraces the two sections of the jaw clutch, one end bearing on a flange on the clutch member 243 and the other abutting the lever 240. Normally the clutch is held in an operative position, against the force of the spring 244, by means of a clutch control lever 245 which is held in the position shown in this figure by a roller 532 (FIGS. 6, 8 and 20) carried on the forwardly extending front leg 531 of a bail 477. This bail is operated in a back-transfer operation to release the lever 245 and hence disable the clutch 242, 243. It follows that the rocking of the lever 240 will be ineffective to rock the digitation control shaft 168, so that even if a value were standing in the keyboard, it could not be entered into the accumulator register.

The rocking of the lever 240 is also normally effective to release the dividend entry key 55 through its engagement with pin 246 (FIG. 6) carried by the rear end of a latch link 247. In the patent mentioned, the link 247 is a single member with a latching nose engaging a shoulder on the stem of the key 55, so that the rocking of the hammer 231 was immediately effective to release the key 55. However, this latch should be disabled in a back-transfer operation as it is desirable to continue machine operation for another cycle—and this can be done most effectively by keeping the key 55 depressed; and the latch must be disabled in order to prevent relatching of key 55. For this reason the latching link is formed in two sections: The link 247 is always operated by operation of lever 240; and a live tip 248 which is connected thereto by a pin-and-slot connection 249, 250. The forward end of the live latch is supported by a pin 427 which is carried by a bellcrank 425 (FIG. 17) associated with the back-transfer mechanism to be mentioned hereinafter, the pin 427 extending through an aperture 428 (FIG. 17) provided in the frame plate 86. Normally the arm is in the position in which the pin 427 lies in the back of a slot 252 in the forward portion, or live tip, 248 of the extensible link, so that the rocking of lever 240 pulls both links 247 and 248 rearwardly. In a back-transfer operation the bellcrank 425 is rocked rearwardly (clockwise in FIG. 17), so that the pin 427 forces the forward portion 248 rearwardly to prevent it from engaging the latching shoulder on the stem of key 55, spring 251 yielding to permit the relative motion between the two parts of the link 247, 248.

It should also be noted here that the hammer 231 is restored to its latched position in the latter part of the cycle in which the keyboard factor is normally entered into the accumulator register. The means for so restoring the hammer 231 is shown in FIG. 20 and comprises a link 260, the rear end of which is pivotally connected to the hammer 231 and the forward end of which is pivotally connected to a lever 261. The upper end of the lever is adapted to be engaged by a roller 262 journalled on a gear 263 which is mounted on the extreme right end of the drive shaft 162. The release of the hammer 231, and its operation by the force of its spring 232 (counter-clockwise in FIGS. 6 and 20), pulls the lever 261 clockwise. Then, shortly after the mid-point of the cycle, the roller 262 will engage the upper end of the lever 261—forcing it forwardly and rocking the hammer 231 back to its inoperative position in which it will again be latched by latch 234.

(II) BACK-TRANSFER MECHANISM

Back-transfer mechanisms have often been classified in two general classes: (1) Those in which the accumulator dials are operatively connected to the selection mechanism and the dials cleared to "0," thereby setting the value taken from a register dial into the co-ordinal selection mechanism; (2) and those in which a value cam is associated with each register dial, which cam is sensed by a sensing mechanism that is also effective to set the co-ordinal selection mechanism. My invention relates to mechanisms of the latter class. This type of mechanism has the advantage that the value standing in the accumulator is not lost as it is in the first type of mechanism but remains in the register, as well as being set in the selection mechanism. It is obvious that if the value in the accumulator is not wanted, it can readily be cleared therefrom, either by a separate clearing operation initiated by the operator, or automatically as suggested in Malavazos, No. 3,045,907.

(1) Value cams and sensors (FIGS. 2, 3, 4 and 9 to 15)

It has already been mentioned that each dial shaft 191 carries a value cam 193 affixed thereto. This cam can be a separate member (either rigidly attached to the dial shaft 191 or the dial 190), or preferably can be die cast of plastic integral with the dial 190. The construction of these cams is best shown in FIGS. 9 to 14, inclusive, in which it is rather obvious (see FIGS. 10 and 11) that it has two levels of operation. It is also obvious from these figures that the cam slots are formed as chords of the circle formed by the circumference of the cam, with the various value notches of incrementally increasing depth. In the past it has been customary for these value notches to generally be arranged as a radius of the cam, which limited the depth which could be used, as the maximum depth could be no more than the difference between the radius of the hub 195 and the radius of the cam. In the past, therefore, it was necessary for the increments of depth of notches in the cam to be quite small, which meant that some mechanism had to be provided in order to multiply these increments of motion into the stepped increments of the selection mechanism. It was previously mentioned that in the commercial "Friden" machines, made under the Friden patents above-mentioned, the normal increment of motion of the selection bars is .062 inch, or roughly 1/16 of an inch, and the accumulator dials are set on 5/8 inch (.625 inch) centers. When it is realized that the diameter of the dial shaft is .156 inch and the outside diameter of the hub is .280 inch it becomes a simple matter of arithmetic to determine that with a radial slot, the maximum depth can only be about .172 inch. Even with the two-selection bar construction that this machine uses, that distance is not sufficient to give increments of motion of .0625 inch (which requires a maximum depth of slot of .310 inch). It is obvious that by cutting the slots on a chord, close to the hub of the dial, this length of slot can be secured readily. This type of chordal, or eccentric, value slots permits the motion of the sensor and the mechanism for setting the selection bars to be equal, and the increments of motion of both mechanisms can approach 1/16 of an inch.

The construction and arrangement of these value notches is shown particularly in FIGS. 10 and 11. This cam is designed to be sensed by a sensing bar, or sensor, 330 which lies adjacent the hub 195 of the dial and has a yoke formation 333 to engage the other side of the dial hub and thereby prevents lateral motion of the rear end of the sensor 330. The rear end of the sensor 330 carries a sensing bracket formed in two levels: A first, or lower, shoulder 331 adapted to engage the ends of slots for the values of "0" and "1" to "4," and a second, or higher, shoulder 332 adapted to engage the slots for the values "5" to "9."

When the dial stands at "0" (as shown in FIG. 10) and the sensor 330 is moved forwardly, the tip of the first level bracket 331 will engage the periphery, or "0" face, 300 of the cam 193 and is thereby blocked against further motion. Normally the sensor shoulder 331 lies a short distance behind the cam, as shown in this figure, and a corresponding amount of play is provided in the mechanism for operating the selection bars. Thus the motion of the sensing shoulder 331 to engage the edge 300 of the cam will merely take up the play in the mechanism and will, therefore, be ineffective to set a value in the selection bars.

When the dial is set to a value of "1" (as shown in FIG. 12), the sensing shoulder 331 penetrates a notch 301 which is one increment in depth (actually, in practice, .062 inch in depth, or roughly 1/16 of an inch). The value notch 302 for a value of "2" is two increments in depth; notch 303 for a value of "3" is three increments in depth; notch 304 for a value of "4" is four increments in depth; and so on, up to, and including, the notch 309, which is nine increments in depth and extends completely through the cam as shown in FIG. 10.

The second, or higher, shoulder 332 is four increments behind the lower shoulder 331, so that when the value "4" is sensed the shoulder 331 is engaging the partially closed end of slot 304 and the shoulder 332 is engaging the periphery 300 (see FIG. 11) as the slots 301 to 304 have a height to accommodate the lower shoulder 331 but not the higher shoulder 332. In this position of the cam and the sensor, even though the restricted inner end of the slot 304 were insufficient to stop the sensor, the shoulder 332, by abutting the periphery 300 of the cam, would effectively block further progress of the sensor.

When the dial is rotated another increment to the "5" position (shown in FIG. 13), the shoulder 332 will engage a notch 315 of one increment in depth in the higher level of the cam 193 (see FIGS. 11 and 13) whereby the sensor 330 is stopped after five increments of movement. This higher notch 315 is aligned with, and forms an offset on, notch 305, so that shoulder 331 passes freely down slot 305 and shoulder 332 stops the sensor as it engages the end of notch 315 (which is sort of a "second story" of notch 305). Similarly, the slots 306, 307, 308 and 309 have contiguous, coaxial higher slots 316, 317, 318 and 319 (FIG. 11) of differentially increasing depth—the slot 319 allowing the shoulder 332 five increments of forward, as shown in FIG. 14.

By means of the cam here shown and described, the sensor 330 is permitted nine increments of forward motion—each increment being the same as that of the motion of the selection bars 150, 151 (in this instance nine increments of .060 inch, although the respective dials have radii of less than 5/16 of an inch). It is obvious from the views shown that there is always sufficient material at the end of any of the slots to resist the small force required to operate the sensors 330 without deforming the cam. By using the two-level slots and the two-level sensing shoulders, and arranging the slots on identical chords (i.e., equidistant from the center of the cam), rather than on a radius of the cam, the translation of the sensor of roughly 9/16 of an inch is permissible, roughly 1/16 of an inch less than the diameter of the dial.

The sensors are Y-shaped links (best shown in FIGS. 3 and 15). The rear end of each sensor 330 is supported by the sensor and its yoke 333 riding upon the co-ordinal clearing stop cam (shown in FIG. 2 but not identified) which is affixed to the dial shaft 191 above the frame bar 180. The front end of the sensor is inserted through slots in the carriage rail 181, as shown in FIGS. 2 and 3. Each of the sensors 331 is resiliently biased to a rearward, inoperative position in which the shoulders will not interfere with rotation of the cams, by any suitable means, such as springs 334 tensioned between a seat formed in an ear on the sensor link and a stud mounted on the top of the frame bar 180. By this means the sensors do not interfere with normal operation of the accumulator dials 190, but can be moved forward against the force of their respective springs by a sensor operator which will next be described.

This type of cam and sensor is especially designed to set one or the other of the co-ordinal pair of selection bars 150, 151 to a value position. The operation of these sensors to set the respective coordinal selection bars 150 or 151, will be explained in sections (4)(c) and (5) below.

*(2) Sensor actuators (FIGS. 2, 3, 4, 15 and 16)*

Each of the sensors 330 is resiliently moved forwardly in a back-transfer operation by means of an actuating link 340—the links being ordinally arranged with the selection slides 150 and 151 as shown in these figures. These various links are slidably mounted in the rear bearing plate 89 and the front crossbar 93, as best shown in FIG. 15. Forwardly of the front crossbar 93 links 340 are provided with a set of ten ratchet teeth 341 which are adapted to latch each link in an adjusted position by means of a latch arm to be described shortly. The forward end of each link is also provided with a downwardly projecting arm 342 which serves as a seat for a tension spring 343. The forward end of each spring 343 is seated in an aperture in the lower end of the arm 342, and the rearward end is seated in spring seats formed in the angle 344 which extends across the keyboard of the machine and supports the shaft upon which the forward struts 152 are mounted. It will be obvious that the spring 343 biases its respective link rearwardly and has a tendency to lightly rock it (counter-clockwise in FIGS. 4 and 15) around the fulcrum formed by the slot in the forward crossbar 93—thus tending to raise the rear end of the link 340 from the position shown in these figures.

The rear end of each link 340 is formed with an upwardly extending arm 345 which preferably is located to the rear (to the right in these figures) of the front bearing plate 89. This arm 345 extends upwardly to a point intermediate the top and bottom of the keyboard frame 101, at which point it is formed with an integral pair of oppositely extending, aligned arms: Arm 346 extending rearwardly and arm 347 extending forwardly. The rear arms 346 of each of the links 340 is formed with a vertically extending ear 348 normally lying behind (to the right of, in these figures) a downwardly extending ear 335 formed on the front end of the sensors 330.

The forwardly extending arms 347 of the links 340 extend through vertical apertures (not shown) in the rear keyboard frame plate 108, and through a respective cam notch 355 (see FIG. 15) formed in a camming bar 356. The camming bar 356 is slidably mounted on the rear end plate 108 by any suitable pin-and-slot connection (not shown). The cam bar, or slide, 356, as shown in FIG. 15, is resilently biased to the right by a suitable spring 357, and its right end is formed as an oblique cam face 358 in order to control the position of the bar. In the normal position of the cam slide 356, the forwardly extending arms 347 of the links 340 lie in the right-hand and lower end of the cam slots 355, so that the rear end of the links 340 is depressed slightly. The amount of depression, while slight, is still sufficient to prevent engagement of ears 348 with the complementary ears 335 on the sensor slides. The cam bar, or slide, 356 will be moved to the right from the force of spring 357 by the operation of the back-transfer key 56 which removes a roller 454 which normally holds the slide 356 in its left-hand position, as will be described in section (4)(c) below. After the release of bar 356, various arms 347 will lie in the left-hand and upper portion of the cam slots 355, whereby the rear end of the links 340 is lifted in order that the ears 348 on the rear ends of the actuating links 340 may engage the corresponding ears 335 on the sensors 330. When this condition is established, the resilent forward translation of the actuating links 340 will move the respective sensors 330 forwardly until they are individually blocked by engagement of the shoulders 331 or 332 with the ends of the slots in the cams.

The resilient operation of the various acutator links 340 is best secured by the rocking of an actuating shaft 360 through an angle of slightly more than 90°. This shaft is suitably journalled in brackets 361 (FIGS. 2 and 3) mounted on the rear end plate 108 of the keyboard frame and is operated by means of a gear segment 362 (see also FIG. 15). The gear segment 362 constantly meshes with a second gear segment 363 mounted on a shaft 364 which will be rocked by the auxiliary drive mechanism to be described in section 5 below.

The shaft 360, as shown in FIGS. 3, 15 and 16, carries a series of ordinally arranged arms 365 which are pinned thereto, or otherwise rigidly mounted thereon. Adjacent each of the arms 365 is a second arm 366 which is rotatably mounted on the shaft 360—the two arms being separated by a concave spacer 367 (FIG. 16) shaped to carry a suitable tension spring 368 tensioned between an ear on the arm 365 and another ear on the arm 366. Each of the rotatably mounted arms 366 carries a pin 369 at the free end thereof, which pin lies within the angle between the vertical stem 345 of each link 340 and the rearward arm 346 thereof. Thus, the rocking of the shaft 360 (clockwise in FIGS. 2, 4 and 15), through the force of each spring 368, resiliently rocks the respective arm 366 to translate each link 340 forwardly until further movement is blocked by the engagement of shoulder 331 or 332 of the co-ordinal sensor 330 with one of the cam faces of the co-ordinal cam 193. Thereafter, the further rotation of the arm 366 and translation of the actuating link 340 is blocked, although the fixed arms 355 rock through an angle of constant magnitude. By this means the various actuating links 340 are translated forwardly a number of increments corresponding to the setting of the co-ordinal dial 190.

Whenever the actuating links 340 are so adjusted, they are latched in the adjusted position by means of a series of co-ordinal leaf springs 375 (FIGS. 4 and 15) which are fixedly mounted on a transverse shaft 376. Adjacent its right end, the shaft 376 carries an arm 377, the free end of which is slotted, as at 378. The slot 378 engages a pin 379 mounted on an arm 380 mounted on a short shaft 381 journalled in the framing of the machine. The vertical arm of the clearing bellcrank 115 (see FIG. 5) lies within a slot 382 formed in the lower end of an arm 383 rigidly mounted on the right end of the shaft 381. Thus, rocking of the clearing bellcrank 115 (clockwise in this figure) rocks the arm 383 and shaft 381 in a counter-clockwise direction. Such counter-clockwise rotation of the shaft 381 (FIGS. 4, 5 and 15), through the operation of arm 380 upon arm 377 (FIG. 4), rocks the shaft 376 in a clockwise direction. It is obvious that the clockwise rocking of shaft 376 (FIGS. 4 and 15) lifts the various latching springs 375 away from engagement with the rack teeth 341 formed in the forward end of each operating link 340. Thus, each link is released from its latch and the various springs 343 promptly snap the links 340 to their rearward and disabled position. However, it is obvious that as the links 340 are moved forwardly in a back-transfer operation, they are normally latched at the extreme limit of their forward translation by the latches 375, and are so held until the operator operates the keyboard release key to return the back-transfer mechanism to an inoperative condition. So long as the actuator links 340 remain in their latched condition, the value transferred from the co-ordinal dial remains as a value set in the selection mechanism and can be used in any machine operation.

*(3) Setting selection bars (FIGS. 2, 4 and 15)*

The mechanism by means of which the selection slides 150 and 151 are set, by the positioning of the co-ordinal actuating link 340, is identical with that shown in FIGS.

43, 44 and 45 of my Patent No. 2,736,494, of February 28, 1956, entitled "Square Root Calculating Machine." In view of the complete disclosure of this mechanism (see column 60, lines 21 to 66, of that patent as well as the figures mentioned), it is believed unnecessary to explain this mechanism in detail. It should suffice to point out that each sensor actuating link 340 carries a downwardly and laterally extending ear 349 that underlies both of the selection bars 150 and 151. In the normal position of the actuating link 340, the forward edge of the ear 349 abuts an interponent 350 (see FIGS. 2 and 4) which is slidably mounted on the "1" to "5" selection bar 150, as shown in FIG. 43 of my patent, No. 2,736,494. A spring (not shown in these drawings but corresponding to spring 1068 of that patent) resiliently biases the selection bar 150 forwardly during the first five increments of motion of the actuating link 340. Thereafter the spring yields and the "1" to "5" selection bar is blocked in its "5" position, as is customary in the machine with which this invention is preferably associated. When the "5" position has been reached the ear 349 abuts a shoulder 351 formed on the "6" to "9" selection bar 151, so that upon the sixth increment of movement of the actuating link 340, the selection bar 151 is moved forwardly one increment to the "6" value position. It is apparent that the forward translation of the sensor actuating link 340 is effective to position the selection bars 150 or 151 to the corresponding value position. Since the actuating link is latched in its adjusted position, it is obvious that the selection bars 150 and 151 are likewise latched in the value position representative of the value standing in the co-ordinal dials 190.

(4) *Back-transfer key (FIGS. 1, 6, 17 and 18)*

Preferably the back-transfer initiating key 56 is located immediately in front of the dividend entry key 55, as shown in FIG. 1. In the preferred embodiment of my invention I desire the depression of the back-transfer key 56 to simultaneously depress the dividend entry key 55 and thus initiate the program of a dividend entry operation in order to shift the carriage B to the desired ordinal position. For this purpose I form the key 56 with a rearwardly extending nose 390 (FIGS. 6, 17 and 18) which overlies a forwardly extending complementary nose 391 on the lower portion of the dividend entry key 55. Thus the operation of the back-transfer key 56 will always depress the dividend entry key 55, and hence initiate the program controlled by that key.

The key 56 is mounted on a long key stem 392, preferably mounted on the inside (left side) of the right frame plate 86. As would be expected, the key stem 392 is preferably mounted on the frame plate 86 by pin-and-slot connections comprising pins 393 engaging slots 394 formed in the key stem. The key stem and key is resiliently biased to its elevated, or inoperative, position by any suitable means, such as spring 399 tensioned between one of the pins 393 and an ear on the lower portion of the key stem.

I prefer that the key 56 be latched in its depressed, or operative, position until the completion of the back-transfer operation, and for this purpose I provide a latch lever 395 which is pivotally mounted on the frame plate by any suitable means, such as pin 396. The lower end of the latch lever 395 is formed with a shoulder 397 adapted to engage a pin 398 carried on a projection of the key stem 392. The latch lever 395 is resiliently biased to a latching position by any suitable spring means 400 which, in the drawings, is shown as a tension spring seated in an aperture in the latch member and a stud on the frame plate. Normally, the key 56 is in its elevated position and the pin 398 engages the rear edge of the latch arm 395, as shown in FIG. 17. However, when the key 56 is depressed, the spring 400 pulls the latch 395 to its latching position in which the shoulder 397 engages the pin 398, as shown in FIG. 18. The key 56 is, therefore, held in its depressed position until the latch is positively released at the end of the back-transfer operation, whereupon the spring 399 snaps the key and its key stem into the upward and inoperative position shown in FIG. 17. The means for releasing the latch 395 will be described later in subsection (*f*) below.

The depression of the dividend entry key 55, by the depression of the back-transfer key 56 as already explained, is effective to initiate operation of the automatic shifting and clearing mechanism. In addition it is also effective to: (a) disable the automatic clearing operation that is normally part of the programmed shifting of the carriage to the desired ordinal position; (b) it disables the customary dividend entry latch 247, 248 (FIG. 6); (c) it sets the sensor actuators described in section (2) above to their operative position by shifting the cam slide 356 to the right to the operative position shown in FIG. 15; (d) it clears the keyboard and locks it against operation; (e) it conditions an auxiliary drive mechanism, which will become effective when the carriage is in the desired ordinal position, to rock shaft 360 and hence operate the sensor actuating links 340 and the sensors 330 to set the value standing in the dials 190 into the co-ordinal selection bars 150, 151; and (f) condition the mechanism to release the latch 395 and hence restore the back-transfer mechanism to its inoperative position at the end of the cycle of operation in which the transfer is effected. These various operations will now be described in sequence.

(*a*) *Disable the register clearing mechanism (FIGS. 17 to 19)*.—The lower end of the key stem 392 is formed as a camming face 401 adapted to engage a pin 410 (FIGS. 17 and 18) mounted on the free, or rearward, end of an arm 411. The arm 411 is rigidly mounted on the right end of a shaft 412 which is journalled in the right side frame 86 and the left side frame 94 (as shown in FIG. 19). A second arm 413 is mounted on the left end of the shaft 412 and at its free end carries a pin 414. The pin 414 engages the front edge of a bellcrank interponent 415 which is mounted at its elbow on the shaft 284. The rear leg of the bellcrank carries a laterally extending ear 416 which engages the lower edge of the clearing control link 282. The shaft assembly (the shaft 412 and its two arms 411 and 413) is resiliently biased to the inoperative position shown in FIG. 17 and in phantom lines in FIG. 19 by any suitable means, such as light spring 417 tensioned between one of the arms and the machine framing. Obviously, the depression of the back-transfer key 56 rocks the arm 411 from the position shown in FIG. 17 to that shown in FIG. 18, and hence rocks shaft 412 and the arm 413 from the phantom line position shown in FIG. 19 to the full line position thereof. Such rocking of the arm 413 rocks the bellcrank (counter-clockwise in this latter figure) and hence lifts the clear clutch control link 282 to an inoperative position. It follows that the rocking of shaft 284, caused by the operation of the dividend entry key 55, will be ineffective to clear the register, although it will be effective to automatically shift the carriage B to the desired ordinal position.

(*b*) *Disable dividend entry latch (FIGS. 6, 17 and 18)*.—The pin 398 carried by the key stem 392 (FIGS. 17 and 18) is adapted to enage the forward end of the horizontal leg of a bellcrank 425 which is mounted at its elbow on a pin 426 secured to the right side frame 86. A pin 427, riveted to, or otherwise rigidly secured on, the lower end of the vertical arm of the bellcrank 425, extends through an aperture 428 in the frame plate, as shown in these figures and FIG. 6. This pin, as shown in FIG. 6, supports the front end of the retractable latch link 247, 248, previously mentioned. When the bellcrank 425 is rocked from the position shown in FIG. 17 to that shown in FIG. 18, the pin 427 moves rearwardly and thereby moves the forward portion 248 of the link rearwardly against the force of spring 251. Such movement of pin 427 and the live tip 248 disables the dividend entry latch from its normal operation.

(c) *Set sensor actuators (FIGS. 4, 15, 17 and 18).*—The upper end of the latch lever 395 (as shown in FIGS. 17 and 18) is adapted to engage a pin 435 rigidly secured to a restoring link 436. The rear end of the link is pivotally secured to a key stem 437 which carries the back-transfer stop key 59. The key stem 437 is pivotally mounted on the frame plate 86 by any suitable means, such as stud 439. Incidentally, it should be noted that the arm 437 and link 436 are detented in either position by means of a detent plate 442 affixed to the hub of the arm 437, with which is associated a detent lever 443, as shown in these figures. The front end of the link is pivotally connected to a two-armed lever 440, likewise pivotally mounted on the right side frame plate 86 by any suitable means, such as stud 441. Incidentally, the rocking of this latter lever will be utilized to condition the mechanism for controlling the operation of the auxiliary clutch drive for the back-transfer operation, as will be described in subsection (e) below.

It is obvious that as the latching lever 395 moves from its inoperative position shown in FIG. 17 to its latching position shown in FIG. 18, it engages the pin 435 and moves the link 436 from the position shown in FIG. 17 to that shown in FIG. 18. Pin 435 extends to the left and is embraced within a notch 450 (FIG. 4) formed in the upper leg of a bellcrank lever 451. The bellcrank lever is rigidly secured to a shaft 452 journalled in the side frames of the keyboard frame 101 and hence extending entirely across the orders of the keyboard (see also FIG. 4). The rearwardly extending leg of the bellcrank 451 is formed with an integral ear 453 which carries the roller 454. The roller 454 is adapted to engage the sloping end 358 of the cam slide 356 (FIGS. 3, 4 and especially 15) which controls the elevation of the rear ends of the sensor actuating links 340. The spring 400 for the latch 395 is relatively strong and is powerful enough to rock the bellcrank 451 from the full line position shown in FIG. 4 to the phantom line position thereof, thereby causing the roller 454 to disengage the right end of the cam slide 356. Such release of the cam slide enables its spring 357 (FIG. 15) to move the slide to the right, and hence, by the shape of its slots 355, to lift the rear end of the actuating links 340. In this operation the force of the springs 343, which tend to bias the links 340 around their fulcrums formed by the front crossbar 93, assists in lifting all of the actuating links to an operating position. When the back-transfer mechanism is restored at the end of the operation, it is done by power sufficient to restore the link 436 from the operative position shown in FIG. 18 to the inoperative position shown in FIG. 17, and hence rocks the bellcrank 451 from the phantom line position shown in FIG. 4 to the full line position shown. This rocking of the bellcrank, from the engagement of the roller 454 with the sloping right end of the slide 356, forces the slide to the left, and thereby moves the projections 347 of the actuating links 340 to the lower end of the slots 355. Such an operation disables the back-transfer actuating mechanism, as the ears 348 on the rear ends of the links 340 no longer engage the corresponding ears 335 on the sensors 330.

(d) *Clear and lock keyboard (FIG. 2).*—A second effect of the translation of pin 435, and the consequent rocking of the bellcrank 451 (FIG. 4), is to first clear a value standing in the keyboard and then lock the keyboard against operation. This is readily accomplished by a mechanism mounted on the shaft 452. It will be recalled that the bellcrank 451 is rigidly secured to this shaft, so that it is obvious the shaft is rocked every time the pin 435 and the link 436 are moved forwardly. It will be recalled also that the bellcrank 451 (FIG. 4) and shaft 452 are rocked (counter-clockwise in this figure) upon depression of the back-transfer key. Hence the shaft 452 is rocked in the same direction in FIG. 2.

This shaft carries a plurality of two-armed levers 459 (FIG. 2) ordinally arranged along the shaft 452 and rigidly secured thereto. A forwardly extending arm 460 of each lever 459 terminates in a perpendicular ear 461 adapted to engage ears 462 projecting upwardly from the respective ordinal latches 103. As the arms 460 rock from their normal position (shown in phantom lines in FIG. 2) to the operative position (shown in solid lines in the same figure), the ears 461 on the extremity of each arm 460 move into engagement with the ears 462 formed on the latching slides 103. Thereafter the latching slides are locked against movement, and hence all of the keys 51 are likewise locked against movement.

A roller 464 is mounted on the extreme rearward, or free, end of an arm 463 of the two-armed lever 459 mentioned above. These rollers are adapted to cooperate with V-shaped cam ears 465 extending upwardly from each of the latching slides 103. The shape of shape of these ears 465 is best shown in FIG. 2. As the roller 464 moves from the normal position (shown in phantom lines in this figure), to its operative position (shown in solid lines in this figure), it first cams the ear, and hence the latching slide rearwardly to release any key latched in an operative position by the latch slide 103. Then, at it rises above the cam face of the ear 465, it releases it. Thereupon the ear 461 on the forward extending arm 460 engages the locking ears 462 formed on the latching slides. By this mechanism, which is rocked by the shaft 452, the keyboard is first cleared and then latched in an inoperative position, and it is impossible for an operator to depress one of the value keys 51 while the back-transfer mechanism is in operation.

(e) *Condition auxiliary drive mechanism (FIGS. 6, 8, 17, 18, 20 to 23).*—It has been mentioned that the front end of the link 436 is mounted upon the lever 440 (FIGS. 17 and 18), which lever 440 is pivoted on the side frame 86 by any suitable means, such as pin 441. In my preferred form of machine, the lever 440 is two-armed and is pivoted adjacent its mid-point. At its lower end it carries a pin 470 which is embraced within a slot 471 carried in the upper end of a short two-armed lever 472. The second lever 472 is pivoted at an intermediate point on another pin 473 secured to the right side frame plate 86. The lower arm of the lever 472 is pivotally connected to a rearwardly extending link 474 by any suitable means, such as pin 475. The rear end of the link 474 is supported by a long pin 476 (see also FIG. 8) carried by the left-hand leg (to the right in FIG. 8 as it is a rear view) of a short bail 477. The bail 477 is journalled on a short shaft 478 which is mounted in the right frame plate 86 and in a bearing bracket 479 that is also used to support the shaft which supports the tabulating control bail 230, already mentioned. The left-hand leg of the bail 477 (to the right in FIG. 8) lies to the left of the right side frame plate 86, while the bail itself extends through an aperture in the frame plate, as is shown in FIG. 17. The right leg of the bail 477 lies in a plane immediately adjacent the dividend entry hammer 231. As shown in FIGS. 8 and 20, the right leg of the bail 477 carries a long pin 480 which is embraced within a slot 512 in the rear end of a clutch control link 511. It is obvious from the above description that the forcing of the link 436 (FIGS. 17 and 18) forwardly, rocks lever 440 (clockwise in these figures). This rocking of lever 440, in turn, rocks the intermediate lever 472 in the opposite direction and pulls the link 474 forwardly. Such translation of the link 474 rocks bail 477 (counter-clockwise in FIG. 17 or clockwise in FIG. 20) and thereby lowers the rear end of the clutch control link 511 to the position shown in FIG. 21.

It should be mentioned at this point that the clutch control link 511 will be operated by the operation of the dividend entry hammer 231 when the carriage B has shifted to the ordinal position determined by a depressed one of the tabulator keys 78, as will be described in section (5) below. For the moment it can be mentioned that the translation of the link 436 has been effective to rock the bail 477, so that when the trigger 231 is operated, the clutch control link 511 will be in its lower, or operative, position and that this link can be operative only when the bail 477 is rocked.

(f) *Restore back-transfer key (FIGS. 17, 18 and 20)*.— It can be mentioned here that the bail 477 will be rocked sharply to its normal position, i.e., to the counter-clockwise position shown in FIG. 20 or the clockwise position shown in FIG. 17 at the end of the back-transfer cycle. The mechanism for so rocking the bail can best be described in section (5) relating to the auxiliary drive which follows. For the moment it should be noted that such rocking of the bail 477 will pull the link 474 (FIG. 18) rearwardly, thereby rocking lever 472 clockwise and lever 440 counter-clockwise. Such rocking of the levers pushes the link 436 rearwardly (to the left in FIG. 18), whereupon the pin 435, through its engagement with the upper end of the latch lever 395, rocks that lever to its unlatching position and releases key 56 to rise from the force of its spring 399. Such release of the latched back-transfer key 56 permits the control bellcrank 425 to rock to its disabled position, thereby disabling the mechanism which sets the back-transfer actuator for operation. It can also be mentioned at this time that rearward movement of the link 436 is effective to rock the two-armed lever 459 (FIG. 2) from the solid line position shown in that figure to the phantom line poistion thereof, thereby unblocking the value keys 51 at the end of the back transfer operation.

The same effect can be secured by manually pushing the back-transfer stop key 59 rearwardly, which has the same effect on latch lever 395 and blocking lever 459. Such an operation of key 59 releases key 56 and all of the mechanisms controlled thereby.

(5) *Auxiliary drive (FIGS. 8, 17, 20 to 23)*

In the preferred form of my invention, the back-transfer actuator is driven by an auxiliary drive mechanism, best shown in FIGS. 20 to 23, which is operative for a single cycle of machine operation. In the usual Friden calculating machine, the idler 201 (FIG. 6) interposed between the drive pinion 200 and the driving sector 202 of the main clutch, is mounted on a stub shaft affixed to the right-hand frame plate 86. In the instant invention I prefer to mount the gear 201 on a shaft 490 which is journalled in suitable bearings carried by the frame plate 86 and the right-hand control plate 87 (see also FIG. 23). In this form the gear 201 is pinned to, or otherwise rigidly mounted on, the shaft 490 adjacent its left end. At its extreme right end the shaft 490 carries a pinion 491, which is likewise pinned to the shaft 490. The pinion constantly meshes with a larger gear 492 which forms the driving side of a single cycle clutch. A clutch ratchet 493 is affixed to the gear 492 or formed integral therewith (FIGS. 21 and 22). The driving gear 492 and its ratchet 493 are rotatably mounted on a short shaft 494 which is mounted in a bearing bracket 495 affixed to the base plate 85. The driven side of the clutch comprises a clutch disk 500 rigidly mounted on a sleeve 501 that is rotatably mounted on the shaft 494. The plate 500 carries a clutch dog 502 rotatably mounted thereon, the tooth 503 of which is biased into engagement with the teeth of ratchet 493 by a suitable spring 504. Normally the clutch dog 502 is held in a disengaged position, against the force of its spring 504, by a suitable control lever 505—the end of the control lever 505 engaging a shoulder 506 formed on the clutch dog. The clutch control lever 505 is resiliently biased into engagement with the clutch dog by a suitable spring 507, and thus normally engages the shoulder 506 of the clutch dog 502 and holds the clutch disengaged.

The clutch control lever 505 is operated by the link 511, the front end (left end in these figures) of which is pinned to the clutch control lever 505. The rear end of this lever is provided with a slot 512 which embraces the pin 480 carried by the bail 477, previously mentioned. Normally the link is supported by the bail 477 in the position shown in FIG. 20, but is lowered to the position shown in FIG. 21 when the bail 477 is rocked by the depression of the back-transfer key 56. When so positioned, a shoulder 513 (as shown in FIG. 21) is lowered into a position immediately behind (to the right of) a pin 264 carried by the restore link 260 for the dividend entry hammer 231.

When the hammer 231 is released from its latch 234 (FIG. 6) by the operation of the automatic tabulating mechanism, the strong spring 232 rocks the hammer sharply (in a counterclockwise direction in this figure). This rocking of the hammer 231 obviously pulls the link 260 rearwardly, or to the right. Normally this has no effect upon the auxiliary clutch control link 511, as it is in the position shown in FIG. 20 in which the shoulder 513 is above the level of pin 264. However, when the back-transfer mechanism has been conditioned for operation and the bail 477 is rocked (clockwise in FIGS. 6, 20 and 21), the shoulder 513 lies to the rear of pin 264 (as shown in FIG. 21). In this condition the rearward translation of the link 260 pulls the link 511 with it, and thereby operates the control lever 505 to cause engagement of the clutch.

The hammer 231 is restored in the third quarter of the cycle by the operation of roller 262 (FIG. 20) on the follower 261 and link 260. Thereupon the link 511 is released and spring 507 biases the control lever 505 into its clutch-disabling position in which its upper end will engage the shoulder 506 on the clutch dog 502. Preferably the clutch is formed with a complete cycle interlock comprising the well-known disk 508 (FIG. 21) mounted on the clutch control lever 505 which, in the disabled position of the clutch dog, lies in a notch 509 of the disk 500. In the other angular positions of the driven disk 500, the interlocking disk 508 rolls on the periphery of the clutch disk 500, and thereby holds the control lever 505 out of engagement with the dog 502 until near the end of a cycle of operation.

It has been mentioned that the driven disk 500 is rigidly mounted on the quill shaft of spool 501. An eccentric cam 520 is mounted on the inner, or left, end of the spool 501 (FIGS. 22 and 23). The periphery of this cam 520 is engaged by a roller 521 mounted on the extremity of the lower leg of a bellcrank 522 (see also FIGS. 20 and 21) that is pivoted at its elbow on a pin 523 mounted on the left side control plate 87. A spring 524, tensioned between a seat of the bellcrank and a stud on the adjacent control plate 87, biases the bellcrank into engagement with the cam 520.

A link 525 (FIGS. 20 and 22) connects the upper leg of the bellcrank 522 to an arm 526 rigidly mounted on the extreme right end of the shaft 364 (see also FIGS. 3 and 15). It will be recalled that the rocking of shaft 364, through the medium of gears 363 and 362, rocks shaft 360; and that the rocking of the shaft 360 is effective to resiliently endeavor to move the various sensor actuating links 340 to an extreme operative position. Thus the rotation of eccentric cam 520, and the consequent rocking of bellcrank 522, is effective to operate the mechanism for resiliently moving the sensor actuating links 340 as far forwardly as is permitted by the setting of the respective value cams 193. It is, therefore, apparent that a single cycle of operation of the clutch 492, 500 is effective in a single cycle of operation to set the value standing in the various orders of the register into the respective orders of the sensor actuating slides 540, the slides being latched in their adjusted position, as heretofore described.

The single rotation of the cam 520 is also operative to restore the bail 477 from its operative position shown in FIG. 21 to its inoperative position shown in FIG. 20, thereby releasing the back-transfer key 56 and restoring all of the back-transfer mechanisms to their original inoperative positions. This is readily accomplished by means of a roller 530 (FIGS. 20 to 23) which engages a tail portion, or forwardly extending leg 531 on the right end of bail 477. This extended leg 531 of the bail 477 is shown in FIGS. 6, 20 and 21. As shown in FIG. 21, the roller 530 will engage the tail portion 533 of leg 531 at approximately the 270° position of the cam 520, thereby rocking the bail 477 (in a counter-clockwise direction in FIGS. 6, 20 and 21) in the fourth quarter of the cycle. This rocking of the bail 477 (counter-clockwise in these figures), through link 474 (FIGS. 17 and 18), levers 472 and 440, forcibly restores link 436 to its original position. This translation of link 436 rocks the latch 395, thereby releasing key 56 to the force of its spring 399; whereupon the key rises to its normal position and the machine comes to rest at the completion of that cycle with all of the parts restored to normal.

(6) *Operation*

While it is believed that the above description of the mechanism will enable one to determine the operation of the machine, it is believed that a brief summary of the steps of operation will be proper. The depression of the back-transfer key 56 (see FIG. 17) simultaneously depresses the customary dividend entry key 55 and thereby initiates the automatic tabulating mechanism controlled by depression of the divided entry key 55. The key 56 is latched in its depressed position by the latch member 395 acting under the force of relatively strong spring 400. The latching of the key 56 in its depressed position is effective to:

(a) Disable the register clearing mechanism through the operation of lever 411, shaft 412, arm 413 (FIG. 19), bellcrank 415, and the consequent lifting of the pusher link 282;

(b) Disables the normal automatic tabulating latch 247, 248 (FIG. 6) by rocking the bellcrank 425 from the position shown in FIG. 17 to that shown in FIG. 18, whereupon its pin 427 is translated rearwardly (to the right in FIG. 6) to disable the latch;

(c) Lifts the rear end of the back-transfer actuating links 340 (FIGS. 2, 5 and 15) so that their resilient operation will be effective to operate the sensors. Such an operation is cause by the rocking of bellcrank 451 (FIG. 4) which releases the cam slide 356 (FIG. 15) so that it can be shifted to the right by the force of its spring 357—thereby enabling the rear end of the various links 340 to rise to their operative position;

(d) Clears the keyboard and immediately thereafter locks it in a cleared condition to avoid inadvertent entry of values thereinto. This is caused by the rocking of the latch lever 395 from the position shown in FIG. 17 to that shown in FIG. 18 in which it engages the pin 435 carried by link 436 and moves it from the position shown in full lines in FIG. 4 to that shown in phantom. Such movement of pin 435, in turn, rocks bellcrank 451, and shaft 452—the rocking of shaft 452, as shown in FIG. 2, rocking arm 463 to first move the ordinal latch slides 103 to a releasing position and then rocking arm 460 into position to block further operation of the latch slide 103;

(e) Conditions the auxiliary drive mechanism for operation upon the operation of the dividend entry hammer 231 (FIGS. 6 and 20) when the carriage is shifted to the selected original position determined by the depression of the tabulator keys 78 (FIG. 1 and 2). This conditioning is cause by the translation of link 436 (FIG. 17), the rocking of levers 440 and 472, the forward translation of link 474 and the consequent rocking of the bail 477 (counter-clockwise in FIG. 17 and clockwise in FIG. 20 to that shown in FIG. 21).

The rocking of the bail 477 conditions the back-transfer mechanism, so that the operation of the hammer 231 pulls the auxiliary clutch control link 511 rearwardly to operate the clutch control lever 505, and hence actuate the clutch 492, 500 for a single cycle of operation. The single cycle of clutch operation caused thereby is effective to rock the bellcrank 522 (clockwise in FIGS. 20, 21 and 22) which, through link 525, arm 526, shaft 364, gear segments 363 and 362 (FIG. 15) and shaft 360, rocks the arms 365 affixed to shaft 360 through a constant path. Such rocking of arms 365, from the force of springs 368, rocks the rotatably mounted arms 366 to resiliently bias the actuating links 340 forwardly, the amount of such translation of links 340 being determined by the distance that the sensors 330 can move forwardly. The amount of such forward movement of the sensors 330 is, of course, determined by the shoulders 331 or 332 at the rear end of the sensors engaging the ends of the respective notches in the cams 193.

The completion of the single cycle of the clutch 492, 500 is effective to restore the bail 477 from the position shown in FIG. 21 to that shown in FIG. 20, thereby, through the linkage shown in FIG. 17, positively restoring link 436 to its rearward position. The rearward translation of link 436 is effective to release the latch 395 and thereby enables the key 56 to rise to its normal and inoperative position.

I claim:

1. In a calculating machine having register wheels, a means for sensing a value standing in said register wheels comprising:
   (1) a rotatable cam plate operatively connected to each register wheel and rotated thereby, said cam plates characterized by:
      (a) a first series of notches of one depth and of incrementally increasing length corresponding to values of one magnitude arranged along identical chords of said plate and lying in one level of said plate,
      (b) a second series of notches of greater depth and of incrementally increasing length corresponding to values of another magnitude arranged along identical chords of said plate and extending into another level of said plate,
   (2) a sensor for sensing the depth of said notches having one shoulder of a height corresponding to said one depth for sensing said first series of notches and a second shoulder of a height corresponding to said greater depth for sensing said second series of notches, and
   (3) a resiliently operated means for operating said sensor.

2. In a calculating machine having register wheels, a means for sensing a value standing in said register wheels comprising:
   (1) a rotatable cam plate connected to each register wheel and rotated thereby, said cam plates being characterized by:
      (a) a first series of notches of incrementally increasing length corresponding to values of one magnitude arranged along a common chord of said cam plate in the respective value positions of said cam plates and lying in one level of said cam plate,
      (b) a second series of notches of incrementally increasing length corresponding to values of another magnitude superimposed on said first series and extending into another level of said cam plate,
   (2) a sensor for sensing the depth of said notches having one shoulder for sensing said first series of notches and a second and higher shoulder for sensing said second series of notches, the two shoulders being separated by a distance equivalent to the distance corresponding to the length of the longest notch in said first series, and
(3) resiliently operated means for operating said sensor.

3. In a calculating machine having:
(a) ordinally arranged rotatable register wheels, and
(b) ordinally arranged selection members,
a means for setting a value standing in said register wheels into said selection members comprising:
(1) a cam connected to each register wheel and rotated thereby, said cams being characterized by
(a) a first series of notches of one depth and of differential lengths corresponding to values of one magnitude arranged along chords of said cam and lying in one elevation of said cam,
(b) a second series of notches of greater depth and of differential lengths corresponding to values of another magnitude superimposed on the first series of notches and extending into another elevation of said cam,
(2) a sensor for sensing the length of said notches having one shoulder of a height corresponding to said one depth for sensing said first series of notches and a second shoulder of a height corresponding to said greater depth for sensing said second series of notches,
(3) resiliently operated means for operating said sensors, and
(4) means controlled by said sensors for positioning said selection members.

4. A calculating machine having:
(a) ordinally arranged register wheels, and
(b) ordinally arranged selection members,
a means for setting a value standing in said register wheels into said selection members comprising:
(1) cams connected to each register wheel, said cams being characterized by
(a) a first series of notches of incrementally increasing length corresponding to values of one magnitude along chords of said cam plate and lying in one level of said cams,
(b) a second series of notches of incrementally increasing length corresponding to values of another magnitude arranged along the same relative chords as said first series of notches lying in another level of said cams,
(2) a sensor for sensing the length of said chordal notches having one shoulder for sensing said first series of notches and a second shoulder for sensing said second series of notches, the two shoulders being separated by a distance equivalent to the distance corresponding to the length of the longest notch in said first series of notches.
(3) resiliently operated means for operating said sensor,
(4) connecting means controlled by said sensor for positioning said selection members, and
(5) means for latching said selection members in an adjusted position.

References Cited by the Examiner

UNITED STATES PATENTS

| | | | |
|---|---|---|---|
| 2,258,714 | 10/1941 | Pitman | 235—60.47 X |
| 3,005,585 | 10/1961 | Capellaro et al. | 235—63 |
| 3,045,907 | 7/1962 | Malavazos | 235—73 |
| 3,108,745 | 10/1963 | Chall et al. | 235—60 |

LEO SMILOW, *Primary Examiner*.